(12) United States Patent
Kiernan

(10) Patent No.: US 11,737,176 B2
(45) Date of Patent: Aug. 22, 2023

(54) LOW PROFILE HEATER APPARATUS AND METHOD OF MANUFACTURE

(71) Applicant: MKS Instruments, Inc., Andover, MA (US)

(72) Inventor: Jeffrey D. Kiernan, Frederick, CO (US)

(73) Assignee: MKS Instruments, Inc.

( * ) Notice: Subject to any disclaimer, the term of this patent is extended or adjusted under 35 U.S.C. 154(b) by 618 days.

(21) Appl. No.: 16/823,715

(22) Filed: Mar. 19, 2020

(65) Prior Publication Data
US 2020/0314967 A1 Oct. 1, 2020

Related U.S. Application Data

(60) Provisional application No. 62/825,777, filed on Mar. 28, 2019.

(51) Int. Cl.
*F16L 53/00* (2018.01)
*H05B 3/03* (2006.01)
(Continued)

(52) U.S. Cl.
CPC ............... *H05B 3/58* (2013.01); *F16L 53/38* (2018.01); *H05B 1/023* (2013.01); *H05B 3/03* (2013.01);
(Continued)

(58) Field of Classification Search
None
See application file for complete search history.

(56) References Cited

U.S. PATENT DOCUMENTS 4,762,978 A * 8/1988 Tanis ................. H05B 3/58
219/209
5,714,738 A 2/1998 Hauschulz et al.
(Continued)

FOREIGN PATENT DOCUMENTS

CA 3046143 A1 6/2018
CN 107509261 A 12/2017
(Continued)

OTHER PUBLICATIONS

KR-101562238-B1, Oct. 2015, Seo et al, Bib. data sheet.*
(Continued)

*Primary Examiner* — Joseph M. Pelham
(74) *Attorney, Agent, or Firm* — Edward Scott Trask

(57) ABSTRACT

A novel low profile heater apparatus and method of manufacture is disclosed, which provides a lower assembly including a first sheet, a heating sheet including at least one heating element, a dielectric sheet, an intermediate sheet and one or more electrical leads configured to supply electrical power to the heating element, the electrical leads extending through a lead sleeve of an upper assembly. The upper assembly includes a top sheet with one or more split sleeves securely attached thereto, thereby forming one or more strain relief assemblies configured to prevent damage to the electrical leads. One or more stitches or coupling features securely attach the upper assembly to the lower assembly. One or more retention device are be used to securely retain the low profile heater apparatus to one or more pipes, tubes or conduits of a plumbing apparatus.

24 Claims, 22 Drawing Sheets

(51) Int. Cl.
*H05B 3/06* (2006.01)
*H05B 3/18* (2006.01)
*H05B 3/58* (2006.01)
*H05B 3/36* (2006.01)
*F16L 53/38* (2018.01)
*H05B 1/02* (2006.01)
*H05B 3/34* (2006.01)
*F16L 53/30* (2018.01)
*F16L 53/35* (2018.01)

(52) U.S. Cl.
CPC ............... *H05B 3/06* (2013.01); *H05B 3/36* (2013.01); *F16L 53/30* (2018.01); *F16L 53/35* (2018.01); *H05B 3/18* (2013.01); *H05B 3/34* (2013.01); *H05B 2203/016* (2013.01); *H05B 2203/017* (2013.01); *H05B 2203/033* (2013.01)

(56) References Cited

U.S. PATENT DOCUMENTS

| | | | |
|---|---|---|---|
| 5,874,712 A | | 2/1999 | Toth et al. |
| 5,883,363 A | * | 3/1999 | Motoyoshi ............... H05B 3/36 |
| | | | 219/535 |
| 8,541,716 B2 | | 9/2013 | Gu et al. |
| 9,686,821 B2 | | 6/2017 | Kiernan et al. |
| 10,021,739 B2 | | 7/2018 | Kiernan et al. |
| 2007/0068931 A1 | * | 3/2007 | Augustine ............... A61F 7/007 |
| | | | 219/549 |
| 2008/0230530 A1 | * | 9/2008 | Augustine ............... H05B 3/347 |
| | | | 219/548 |
| 2012/0125913 A1 | * | 5/2012 | Song ....................... F16L 53/38 |
| | | | 219/546 |
| 2012/0279953 A1 | * | 11/2012 | Augustine ................ A61F 7/08 |
| | | | 219/217 |
| 2015/0083705 A1 | | 3/2015 | Cronn et al. |
| 2015/0262739 A1 | | 9/2015 | Russegger et al. |
| 2015/0366367 A1 | * | 12/2015 | Augustine ............... H05B 3/146 |
| | | | 219/217 |
| 2015/0373781 A1 | * | 12/2015 | Augustine ............... B23K 13/00 |
| | | | 219/217 |
| 2020/0189229 A1 | * | 6/2020 | Palmer ..................... H05B 3/34 |
| 2020/0314967 A1 | * | 10/2020 | Kiernan ................... H05B 3/36 |
| 2022/0042639 A1 | * | 2/2022 | Grande ..................... H05B 3/18 |

FOREIGN PATENT DOCUMENTS

| | | | | |
|---|---|---|---|---|
| DE | 8223072 | U1 | 4/1987 | |
| DE | 69733793 | T2 | 4/2006 | |
| EP | 0806123 | A1 | 11/1997 | |
| EP | 2557894 | A1 | 4/2011 | |
| EP | 2557894 | A1 | 2/2013 | |
| JP | 201338084 | A | 2/2013 | |
| KR | 101562238 | B1 * | 10/2015 | |
| KR | 101562238 | B1 | 10/2015 | |
| KR | 2041157 | B1 * | 11/2019 | ............. F16L 53/35 |
| TW | 201630465 | A | 8/2016 | |
| WO | 9623392 | A1 | 8/1996 | |
| WO | WO2017/007622 | A1 | 1/2017 | |

OTHER PUBLICATIONS

KR-2041157-B1, Nov. 2019, Ho, Bib. data sheet.*
The PCT international Search Report issue to PCT/US2020/023549 dated Jun. 30, 2020, 4 pages.
The PCT Written Opinion issue to PCT/US2020/023549 dated Jun. 30, 2020, 5 pages.
The European Search Report for EPC counterpart application No. 20777897.8 dated Nov. 9, 2022 (32 pages).
The Singapore Office Action for Singapore counterpart application No. 11202109695S dated Oct. 26, 2022 (5 pages).

* cited by examiner

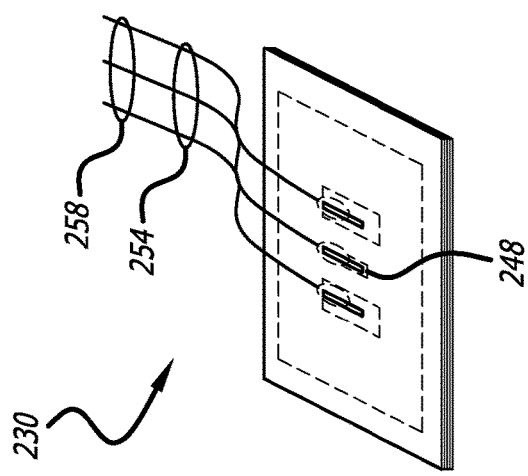
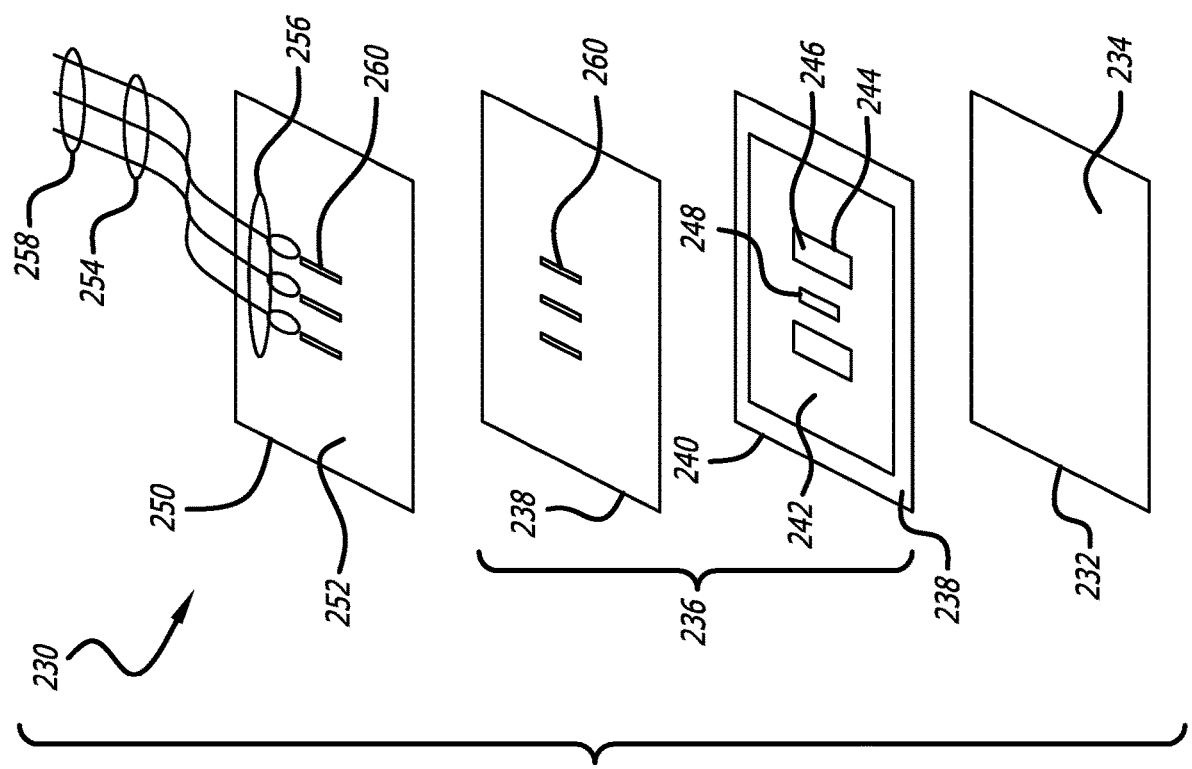

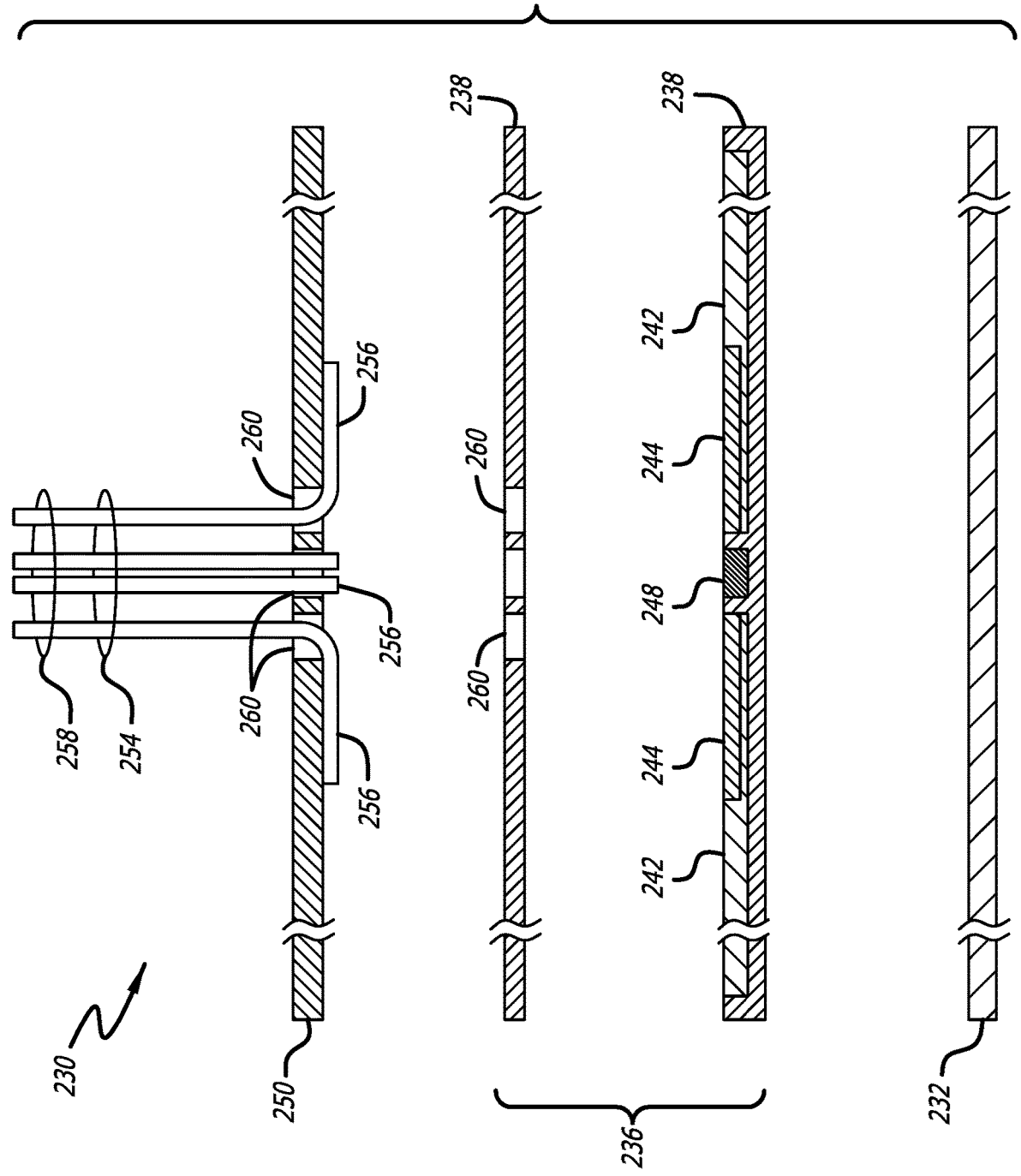

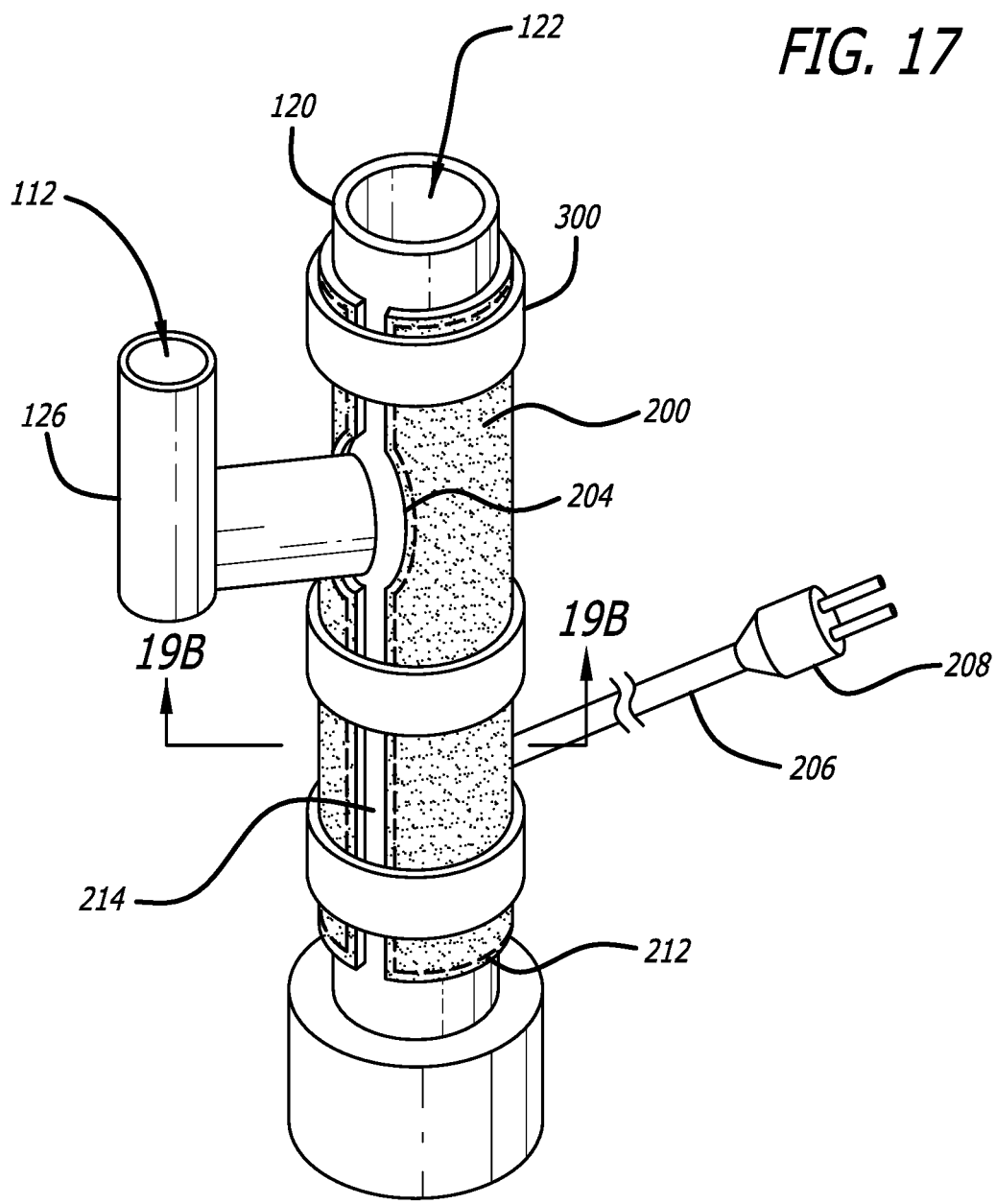

LOW PROFILE HEATER APPARATUS AND METHOD OF MANUFACTURE

CROSS-REFERENCE TO RELATED APPLICATIONS

The present application claims priority to U.S. Provisional Patent Application Ser. No. 62/825,777—entitled "Low Profile Heater Apparatus and Method of Manufacture," filed on Mar. 28, 2019, the contents of which are incorporated by reference in their entirety herein.

BACKGROUND

Heater jackets and heater assemblies attached to valves and pipeline heaters applied to plumbing lines are used in a wide variety of applications, including semiconductor manufacturing in chemical vapor deposition (CVD) systems. CVD processes often use flammable, pyrophoric, toxic, and corrosive gases or vapors. These need to be handled properly to ensure the safety of the users, and the post-process effluent gases need to be properly treated and neutralized to meet environmental safety standards. Downstream effluents in some thin-film manufacturing processes can lead to yield loss and unplanned equipment downtime due to clogged lines, damaged pumps and valves, and contaminated transducers. Effluent management devices such as gas abatement systems are used to destroy unreacted precursor gases and other byproducts of CVD processes when the reaction chamber is purged. The inlet plumbing of such gas abatement systems may be clogged by the condensation or accretion of various effluents on interior plumbing surfaces. Heater jackets and heater assemblies installed on plumbing lines and other components are used to maintain the various process chemicals in a vapor state, thereby reducing the condensation or accretion of these effluents. Other applications for heater jackets and heater assemblies include analytical instrumentation, pharmaceutical manufacturing, and industrial coating.

While prior art heater jackets and heater assemblies have proven useful in the past, a number of shortcomings have been identified. Specifically, prior art heaters with silicone insulation are bulky and due to space constraints in the inlet heads of gas abatement systems. Further, installation of these silicone heaters onto plumbing can be difficult, time consuming, and the heaters and electrical conductors may be damaged during the installation process, resulting in shortened service lifetime and higher maintenance costs. The difficulty in installation may also result in ineffective or non-uniform heating of the plumbing, resulting in clogging of the inlet head plumbing.

As such, there is an ongoing need for an improved heater jacket or heater assembly for use in a variety of processing systems.

SUMMARY

The present application discloses various embodiments of a low profile heater assembly and its method of manufacture. In one embodiment, the present application discloses a low profile heater assembly. The low profile heater assembly may include at least one lower assembly, that includes at least one first sheet, at least one heating sheet including at least one heating element formed on one or more dielectric sheets, at least one intermediate sheet, and one or more electrical leads in electrical communication with the at least one heating element and configured to supply electrical power to the at least one heating element. The low profile heater assembly may further include at least one upper assembly, with at least one top sheet with one or more passages formed therein, the passages configured to allow at least one lead sleeve to traverse therethrough. The electrical leads may extend through at least one lead sleeve passage formed in the lead sleeve. At least one strain relief structure configured to prevent damage to the electrical leads may be formed in the upper assembly by securing one or more split sleeves to the top sheet with one or more stitches or coupling features. The upper assembly and lower assembly may be securely joined by one or more perimeter stitches or coupling features extending around the perimeter of the upper and lower assemblies, thereby forming a heater body. In another embodiment, the low profile heater assembly further includes one or more retention members configured to engage and securely retain the heater assembly in thermal communication with one or more tubes of a plumbing apparatus. One or more reliefs, apertures, or chamfers may be formed in the heater body to provide clearance for various fittings or other features of one or more tubes of a plumbing apparatus.

In another embodiment, the present application discloses a heater apparatus, comprising at least one lower assembly including at least one first sheet made from at least one heat-resistant fabric, at least one heating sheet including at least one dielectric sheet, at least one heating element formed on the dielectric sheet, and one or more pads formed on the heating element, the pads configured to allow one or more electrical leads to be attached in electrical communication with the heating element. The lower assembly may further include at least one intermediate sheet, including one or more passages formed on or therethrough and configured to permit electrical leads to traverse through the passages and be securely attached in electrical communication with the pads formed on the heating element. The heater apparatus further comprises at least one upper assembly including at least one top sheet with at least one passage formed therein, the passage configured to allow at least one lead sleeve to traverse therethrough, the lead sleeve further including one or more split sleeves and lead sleeve passage extending therethrough, the lead sleeve passage configured to accept the electrical leads from the lower assembly to pass therethrough. One or more stitches or coupling features are used to securely attach the split sleeves to the top sheet, thereby forming a strain relief structure configured to protect the electrical leads from damage during installation or use. One or more perimeter stitches or coupling features may extend around the perimeter of the lower assembly and the upper assembly, thereby securely attaching the upper assembly to the lower assembly, to form at least one heater body.

In another embodiment, the present application discloses a method of manufacture of a low profile heater assembly. The method of manufacture includes providing at least one lower assembly, the lower assembly comprising at least one first sheet, at least one heating sheet including at least one dielectric sheet with at least one heating element formed thereon, at least one intermediate sheet, and one or more electrical leads in communication with the at least one heating element. The method further comprises providing at least one least one upper assembly, the upper assembly comprising at least one top sheet with one or more passages formed therein, the one or more passages configured to allow at least one lead sleeve to traverse therethrough, the lead sleeve further including one or more split sleeves and lead sleeve passage extending therethrough, the lead sleeve passage configured to accept the electrical leads from the lower assembly to pass therethrough. One or more strain relief structures are formed in the at least one upper assembly by stitching or otherwise coupling the split sleeves to the top sheet with one or more stitches or coupling features. The lower assembly and one upper assembly are then securely attached to each other with one or more stitches or coupling features extending around the perimeter of the lower assembly and the perimeter of the upper assembly, the one or more stitches or coupling features configured to securely attach the upper assembly to the lower assembly, to form at least one heater body.

Other features and advantages of the low-profile heater assembly and method of manufacture as described herein will become more apparent from a consideration of the following detailed description.

BRIEF DESCRIPTION OF THE DRAWINGS

Various embodiments of a low profile heater apparatus and method of manufacture will be explained in more detail by way of the accompanying figures, wherein:

FIG. 3 shows an exploded view of an embodiment of a lower assembly of a low profile heater assembly;

FIG. 4 shows an elevated perspective view of an embodiment of the lower assembly of the low profile heater assembly shown in FIG. 3;

FIG. 5 shows an exploded cross-sectional view of an embodiment of the lower assembly of a low profile heater assembly shown in FIG. 4;

FIG. 17 shows an elevated perspective view of an embodiment of the low profile heater assembly shown in FIG. 15B as installed on a tube of the inlet head shown in FIG. 2;

DETAILED DESCRIPTION

Figure 1:
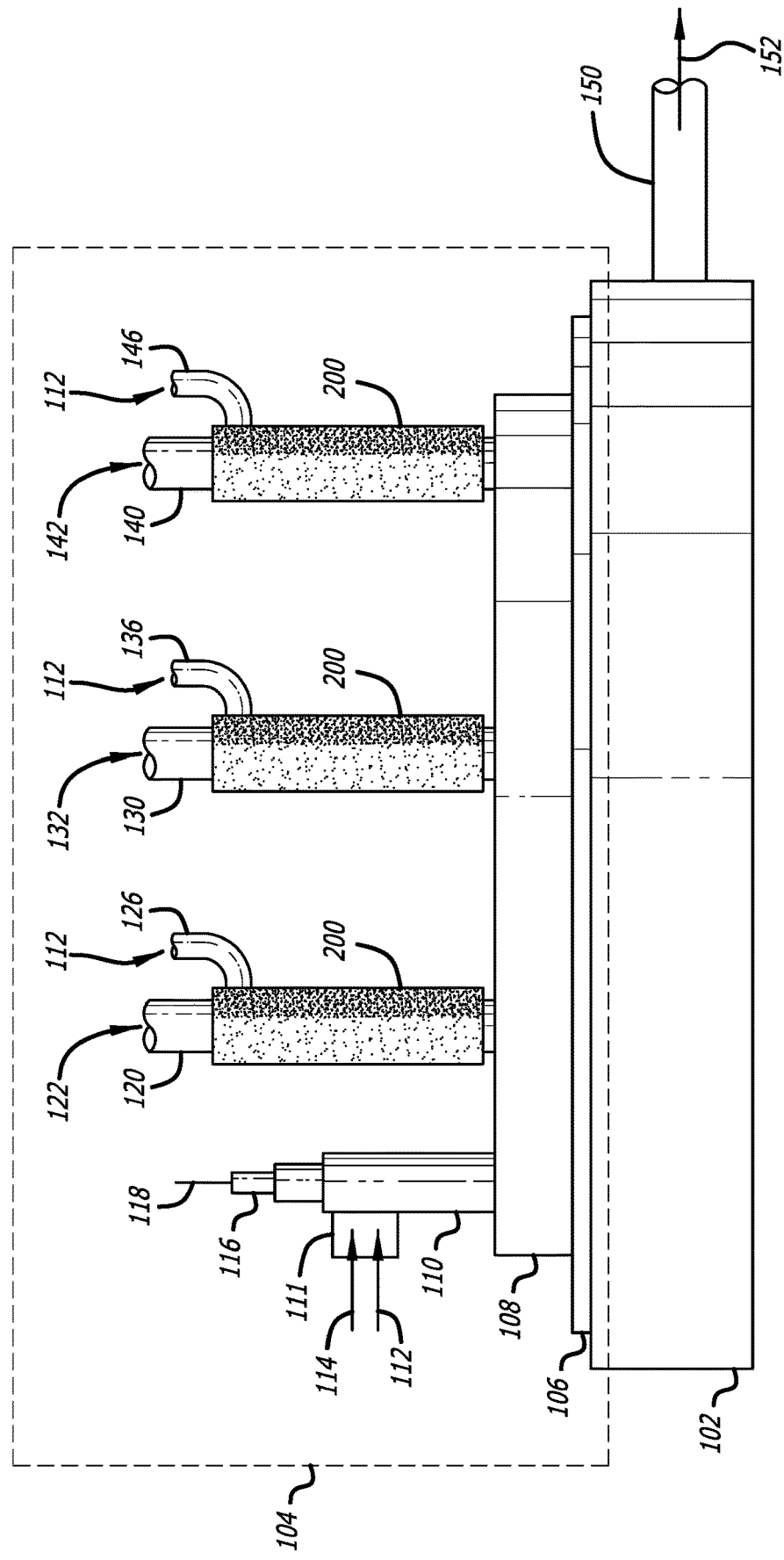
FIG. 1 shows a diagram of an embodiment of a gas abatement system.

FIG. 1 shows a schematic of an exemplary gas abatement system 100. As shown, the gas abatement system 100 includes at least one combustion box 102 and at least one inlet head 104 configured to route one or more effluents 122, 132, and 142 to at least one the combustion box 102. Exemplary effluents include, without limitation, fluorinated gases such as $NF_3$, $F_2$, $ClF_3$, $C_2F_6$, $C_3F_8$, $CF_4$ and $SF_6$; dielectric etch input gases $CHF_3$ & $C_4F_8$; inorganic halides $COCl_2$ (phosgene), $COF_2$ (fluorophosgene), $WF_6$, $SiCl_4$, $TiCl_4$, and $AlCl_3$; byproducts HF & $SiF_4$; hydrides, organometallics, metal alkoxides, and the like. Those skilled in the art will appreciate that any variety of effluents or byproducts may be processed in the gas abatement system 100.

As shown in FIG. 1, the inlet head 104 includes at least one manifold 108 with one or more tubes, conduits, pipes, transport members, or passage bodies 120, 130 and 140 connected thereto or extending therefrom, each tube configured to transport at least one effluent to the combustion box 102. In one embodiment, the tubes 120, 130, 140 come from a single CVD system. Optionally, each of the tubes 120, 130, 140 may come from any number or type of CVD systems. Those skilled in the art will appreciate that any number of tubes from any number or combination or types of systems may be connected to the manifold 108. At least one flange 106 configured to mount the inlet head 104 to the combustion box 102 may be formed on or attached to the manifold 108. Optionally, a flange need not be used to mount the inlet head 104 to the combustion box 102. One or more fittings 126, 136, 146 may be attached to or formed on the respective tubes 120, 130, 140. In the illustrated embodiment, the fittings 126, 136, 146 are configured to route at least one oxidizer 112 into the combustion box 102 via the tubes 120, 130, 140. Optionally, the fittings 126, 136, 146 may be configured to route effluents to the tubes 120, 130, 140. One or more fuel input bodies or transport conduits 110 may be attached to or formed on the manifold 108. At least one port 111 configured to allow at least one fuel 114 to enter the manifold 108 may be attached to or formed on the fuel input body 110. Optionally, the oxidizer 112 may also be pumped into the manifold 108 via port 111. At least one igniter 116 in communication with the port 111, the manifold 108 and the combustion box 102 may be located on the fuel input body 110 or manifold 108. In the illustrated embodiment, the igniter 116 is a spark plug such as those used in gasoline engines. Optionally, the igniter 116 may be a glow plug like those used in diesel engines. The ignitor 116 may be powered by one or more electrical signals via a conduit 118. Those skilled in the art will appreciate that that any variety of ignition devices may comprise the igniter 116. During use, the oxidizer 112 and fuel 114 are pumped into the combustion box 102 and ignited by the igniter 116, thereby burning the effluents 122, 132, 142 and creating at least one exhaust 152 that may exit the combustion box 102 via at least one exhaust conduit 150. In the illustrated embodiment, the oxidizer 112 is pure oxygen. Optionally, air, clean dry air (CDA), nitrous oxide or a combination of these may be used as the oxidizer 112. Those skilled in the art will appreciate that any variety of oxidizer may be used. In the illustrated embodiment, the fuel 114 is natural gas (including methane and similar hydrocarbons found in natural gas). Optionally, hydrogen, propane, kerosene, gasoline or diesel fuel or a combination of these may be used as the fuel 114. Those skilled in the art will appreciate that any variety of fuels may be used as the fuel 114 in the gas abatement system 100.

Figure 2:
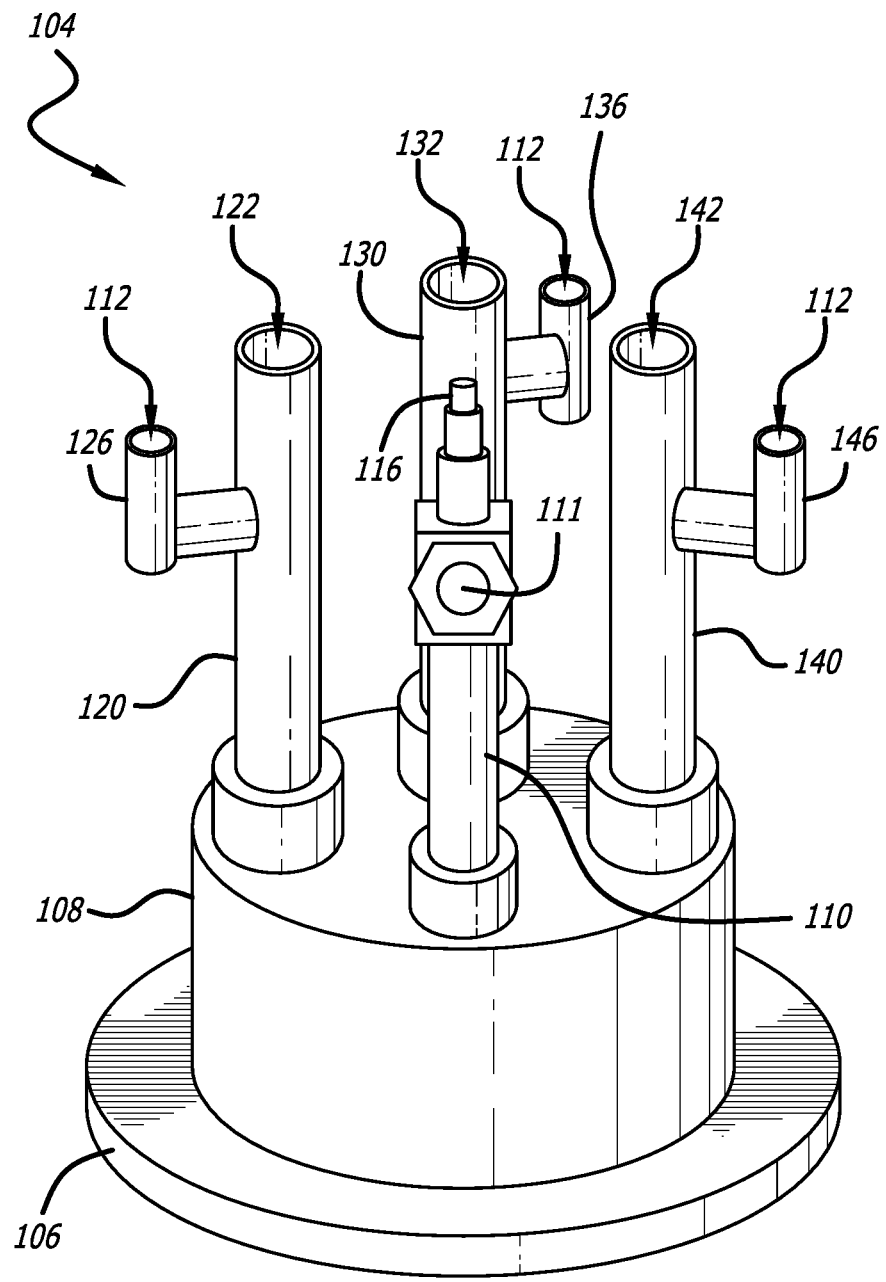
FIG. 2 shows an elevated perspective view of an embodiment of an inlet head for use with the gas abatement system shown in FIG. 1.

During operation of the gas abatement system 100, the effluents 122, 132, 142 and other materials may condense or accrete onto various components, including the tubes 120, 130, 140, the fittings 126, 136, 146 and the interior components or surfaces of the manifold 108. At least one heater assembly 200 configured to maintain the tubes, pipes and fittings at an elevated temperature may be installed on these components or any components used in the gas abatement system 100. FIG. 2 shows an elevated perspective view of an exemplary inlet head assembly 104 for use in the gas abatement system 100 shown in FIG. 1. During use, heater assemblies 200 may be used to maintain the tubes 120, 130, 140 at a desired temperature. For example, in one embodiment, the heater assemblies 200 may be configured to maintain the tubes 120, 130, 140 at a temperature between about 100° C. and about 250° C. Optionally, the heater assemblies 200 may be configured to maintain the tubes 120, 130, and 140 at different temperatures. For example, in one embodiment, heater assemblies are configured to maintain the tubes 120, 130, and 140 at the same temperature. Those skilled in the art will appreciate that the heater assemblies 200 may be used to maintain the temperature of the tubes 120, 130, 140 and other inlet head components at any variety or range of temperatures.

FIGS. 3-5 show various views of a lower assembly 230. As shown in FIG. 3, in the illustrated embodiment, the lower assembly 230 comprises at least one first sheet 232, at least one heating sheet 236, and at least one intermediate sheet 250. Exemplary materials for the first sheet 232 include polyimide fabric, Kevlar fabric, and the like. Optionally, those skilled in the art will appreciate that any variety of heat-resistant materials may be used in the first sheet 232. The first sheet 232 may include at least one undersurface 234 configured to transfer heat from the heating sheet 236 to the tubes 120, 130 and/or 140. In one embodiment, the heating sheet 236 may include at least one heating element 242 formed on or attached to at least one surface 240 of at least one dielectric sheet 238. In another embodiment, the heating sheet 236 may include one or more additional dielectric sheets 238 positioned above the heating element 242. One or more pads 244 configured to provide electrical contact to the heating element 242 may be formed on or integral to the heating element 242. One or more electrical connectors 246 configured to conduct electrical power or signals to the heating element 242 may be attached to the pads 244. The heating element 242 may comprise an etched foil resistive material deposited on or otherwise attached to the dielectric sheet 238. Exemplary resistive materials include, without limitation, Inconel 600, Nichrome (NiCr), Kanthal (FeCrAl), and Cupronickel (CuNi), although those skilled in the art will appreciate that any variety of resistive material may be used as the heating element 242. Optionally, the heating element 242 may comprise resistance wires, intermetallic compounds, PTC ceramic elements, composite heaters, thick films and the like. In the illustrated embodiment, the dielectric sheet 238 is a polyimide film. Optionally, the dielectric sheet 238 may formed from silicone rubber, Kapton, Kevlar, Teflon or PTC rubber, although those skilled in the art will appreciate that the dielectric sheet 238 may be formed of any variety of materials. Optionally, at least one insulating material (not shown) and/or at least one adhesive (not shown) may be applied to the dielectric sheet 238. Exemplary adhesives include, without limitation, pressure sensitive adhesives (PSA), spray adhesives, and the like. At least one temperature sensor 248 configured to sense the temperature of the heating sheet 236 and transmit a signal to one or more heater controllers (not shown) may be attached to or formed on or integral to the heating sheet 236 or heating element 242. The upper assembly 230 also includes at least one intermediate sheet 250 configured to provide thermal or electrical insulation between the lower assembly 230 and the upper assembly 270. Exemplary materials for the intermediate sheet 250 include polyimide fabric, Kevlar fabric, and the like. Optionally, those skilled in the art will appreciate that any variety of heat-resistant materials may be used in the intermediate sheet 250.

As shown in FIGS. 3-5, the intermediate sheet 250 and the dielectric sheet 238 include one or more passages 260 formed in or integral to at least one surface 252 and configured to allow at least one proximal end 256 of one or more electrical leads 254 to traverse therethrough and be electrically connected to the pads 244 or connectors 246 of the heating sheet 236. Optionally, connectors 246 need not be used, and the proximal ends 256 of each lead 254 may be soldered or otherwise electrically contacted directly to the pads 244. Optionally, pads 244 need not be used, and the proximal ends 256 of the electrical leads 254 may be attached in electrical communication directly to the heating element 242 in any variety of ways. FIG. 4 shows the completed lower assembly 230. FIG. 5 shows an exploded view of the lower assembly 230. The proximal ends 256 of the electrical leads 254 may also traverse through the passages 260 formed in the optional dielectric sheet 238. In the illustrated embodiment, the first sheet 232, the heating sheet 236 and the intermediate sheet 250 are stacked in facing alignment with no adhesive material between them. Optionally, at least one adhesive (not shown) may be applied between the sheets 232, 236 and 250. The distal ends 258 of the leads 254 extend away from the intermediate sheet 250.

Figure 6:
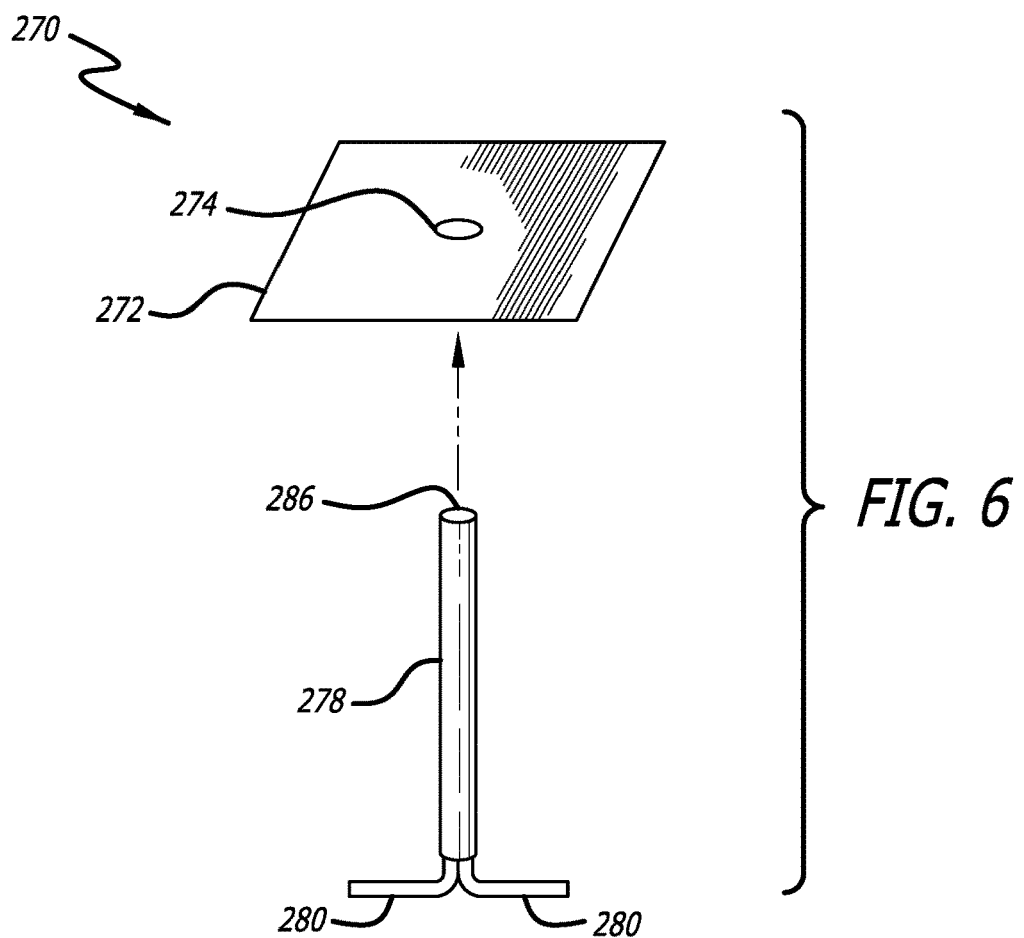
FIG. 6 shows an exploded view of an embodiment of an upper assembly of a low profile heater assembly.
Figure 7:
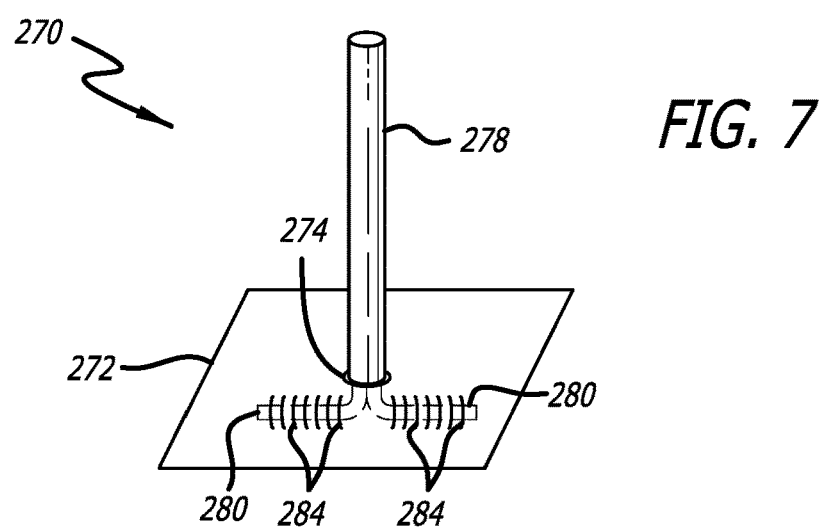
FIG. 7 shows an elevated perspective view of an embodiment of the upper assembly of a low profile heater assembly shown in FIG. 6.

FIGS. 6-9 show various views of an upper assembly 270. FIG. 6 shows an exploded view of the components of the upper assembly 270. As shown in FIG. 6, at least one passage 274 configured to allow at least one lead sleeve 278 to traverse therethrough may be formed in at least one top sheet 272. Exemplary materials for the top sheet 272 include, without limitation, polyimide fabric, Kevlar fabric, and the like. At least one passage 286 configured to receive the leads 254 from the lower assembly 230 may be formed in or integral to the lead sleeve 278. In the illustrated embodiment, the lead sleeve 278 is made of electrical insulation, wire loom material, or similar materials. Optionally, the lead sleeve may be heat-shrink tubing configured to encapsulate the leads 254. Those skilled in the art will appreciate that any variety of materials may comprise the lead sleeve 278. As shown in FIG. 7, in the illustrated embodiment, the lead sleeve 278 may be split into one or more split sleeves 280 configured to be securely attached to the top sheet 272 by one or more stitches or coupling features 284. In the illustrated embodiment, the stitches or coupling features 284 comprise a high-temperature thread. Exemplary high-temperature thread materials include, without limitation, cotton, nylon, polyester, alumina, fiberglass, aramid, Kevlar, Nomex, PTFE-coated quartz, PTFE-coated fiberglass, ceramics and stainless steel. Those skilled in the art will appreciate that any variety of thread materials may be used. Optionally, the stitches or coupling features 284 may comprise a variety of adhesives or elastomers, though those skilled in the art will appreciate that any variety of coupling materials may be used in the stitches or coupling features 284.

Figure 8:
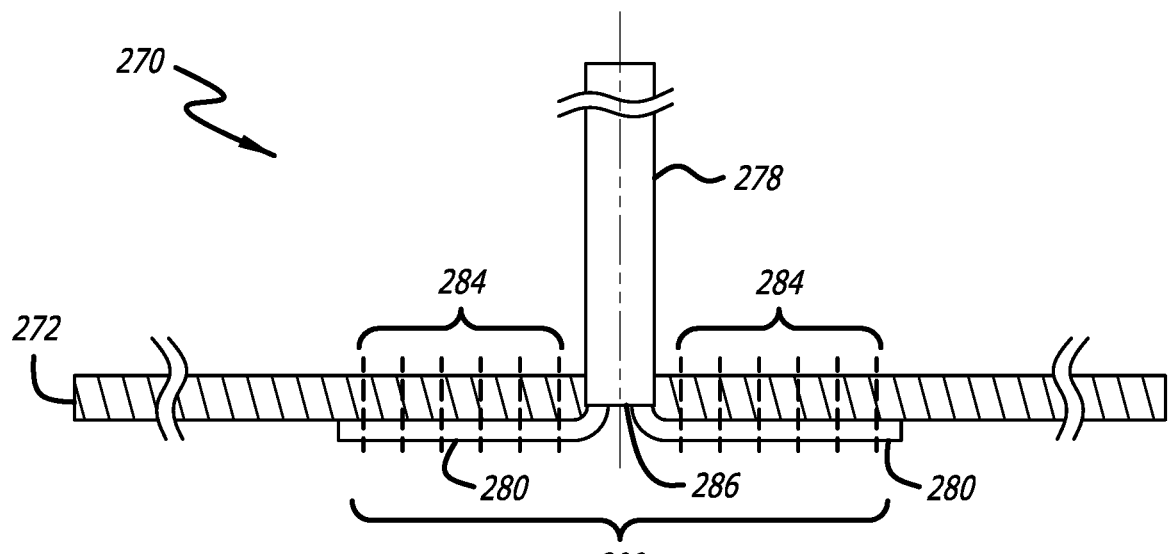
FIG. 8 shows a cross-sectional view of the embodiment of the upper assembly of a low profile heater assembly shown in FIG. 7.
Figure 9:
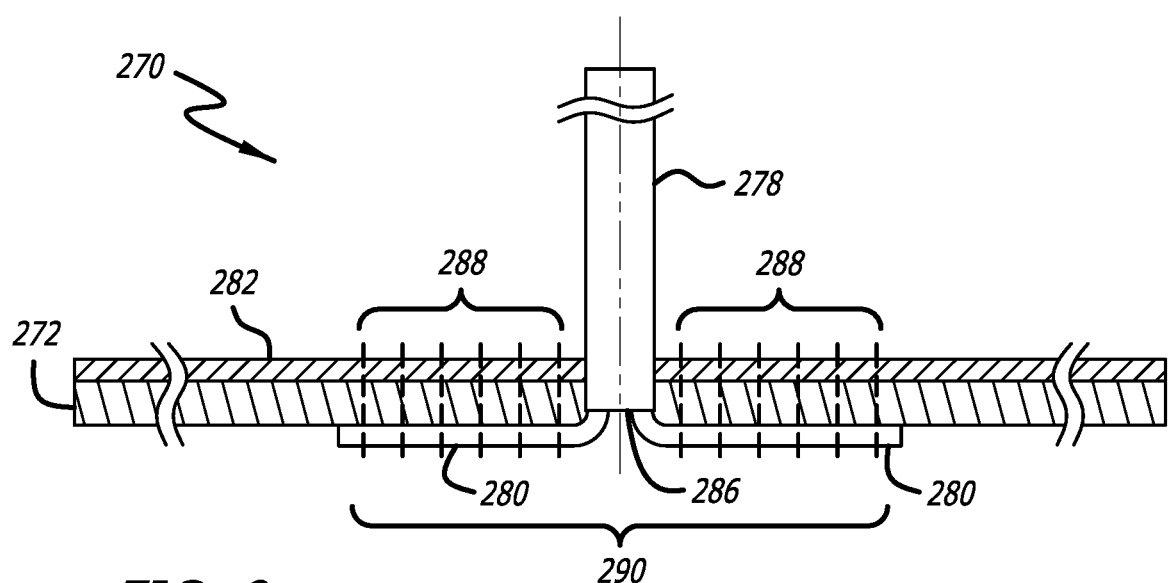
FIG. 9 shows a cross-sectional view of an alternate embodiment of an upper assembly of a low profile heater assembly.

FIGS. 8 and 9 show cross-sectional views of various embodiments of the upper assembly 270. As shown in FIG. 8, in the illustrated embodiment, the split sleeves 280 are fastened to the top sheet 272 by one or more stitches or coupling features 284, thereby creating a strain relief structure 290 configured to prevent damage to the electrical leads shown in FIG. 4, while leaving the passage 286 open to receive the distal ends 258 of the leads 254. FIG. 9 shows an alternative embodiment of the upper assembly 270 wherein a cover sheet 282 is fastened to the top sheet 272 and the split sleeves 280 with one or more stitches or coupling features 288 to provide additional protection for the heater assembly 200, for cosmetic purposes, or to provide additional strength to the strain relief structure 290 of the upper assembly 270. The stitches or coupling features 288 may be formed from the same or similar materials or combination of materials as described above with respect to the stitches or coupling features 284. In the illustrated embodiment, the strain relief structure 290 is configured to be very compact and provide the same or superior performance compared to strain relief configurations used in prior art silicone heater jackets.

Figure 10:
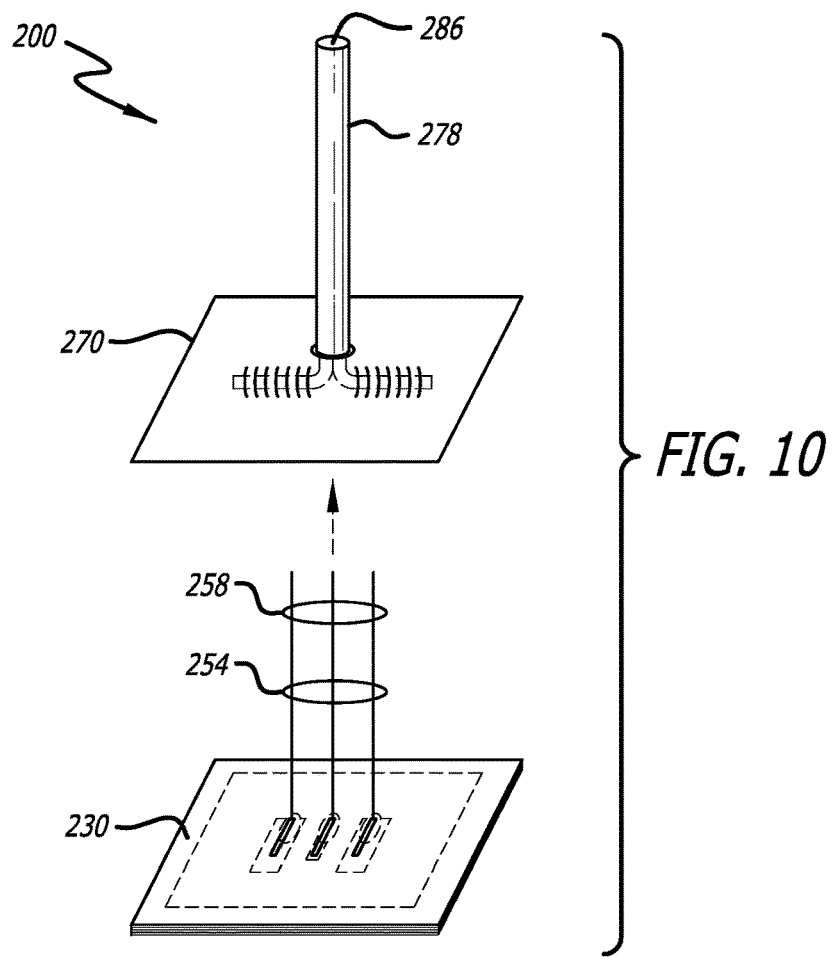
FIG. 10 shows an exploded view of an embodiment of a low profile heater assembly.
Figure 11:
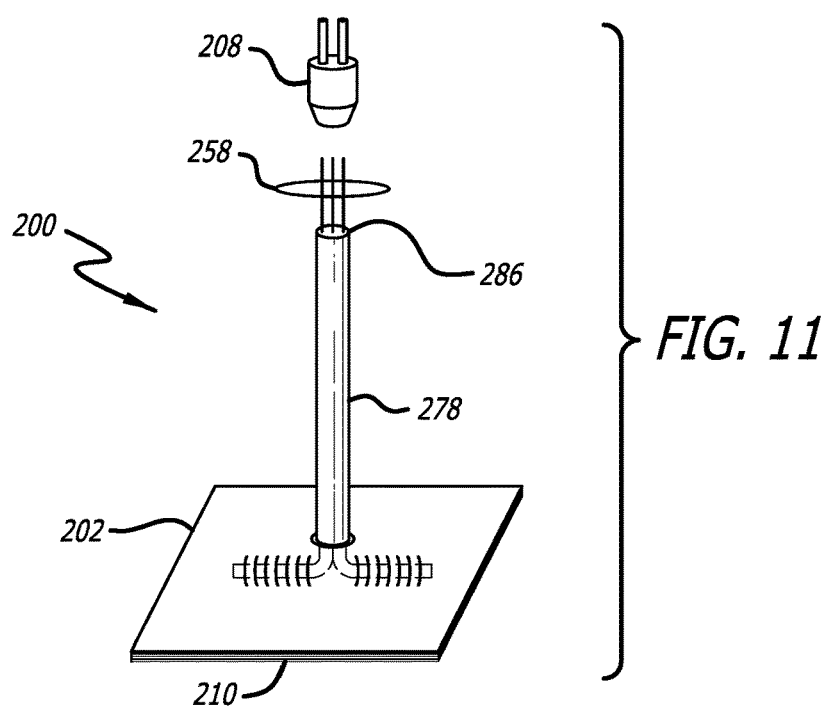
FIG. 11 shows an exploded view of an embodiment of a low profile heater assembly.
Figure 12:
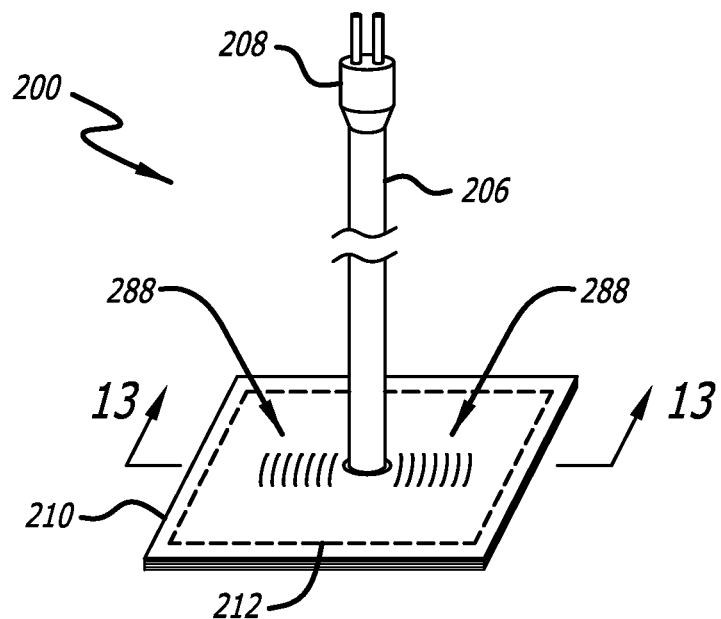
FIG. 12 shows an elevated perspective view of the embodiment of a low profile heater assembly shown in FIGS. 10 and 11.

FIGS. 10-15B show various views of the heater assembly 200. FIG. 10 shows an exploded view of the heater assembly 200. As shown, the distal ends 258 of the leads 254 from the lower assembly 230 may traverse through the passage 286 of the lead sleeve 278 of the upper assembly 270. FIG. 11 shows an elevated perspective view of the heater assembly 200 with the distal ends 258 of the leads 254 exiting the conduit 286 of the lead sleeve 278. One or more connectors 208 configured to provide electrical connection to the leads 254 may be formed on or coupled to the lead sleeve 278 and the distal ends 258 of the leads 254. Optionally, connectors 208 need not be used, and the distal ends 258 may be electrically connected to similar electrical leads from other heater assemblies, either in series (daisy chained) or in parallel, or connected to one or more heater controllers (not shown), in any way desired or beneficial. Those skilled in the art will appreciate that the distal ends 258 of the electrical leads 254 may be connected to any variety of device in any number of configurations. FIG. 12 shows an elevated perspective view of the heater assembly 200 with one or more perimeter stitches or coupling features 212 applied around the perimeter 210 of the heater body 202 formed by the upper assembly 270 and the lower assembly 230 shown in FIG. 10. The perimeter stitches or coupling features 212 may be formed from the same or similar materials or combination of materials as described above with respect to the stitches or coupling features 284 and 288.

Figure 13:
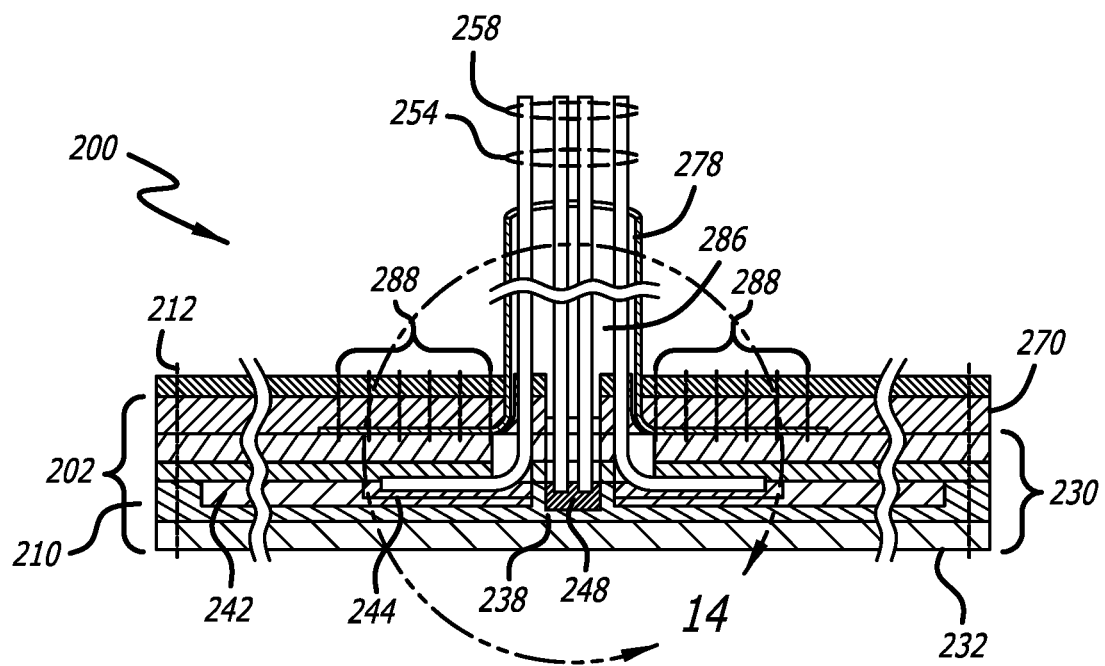
FIG. 13 shows a cross-sectional view of the embodiment of the low profile heater assembly shown in FIG. 12.
Figure 14:
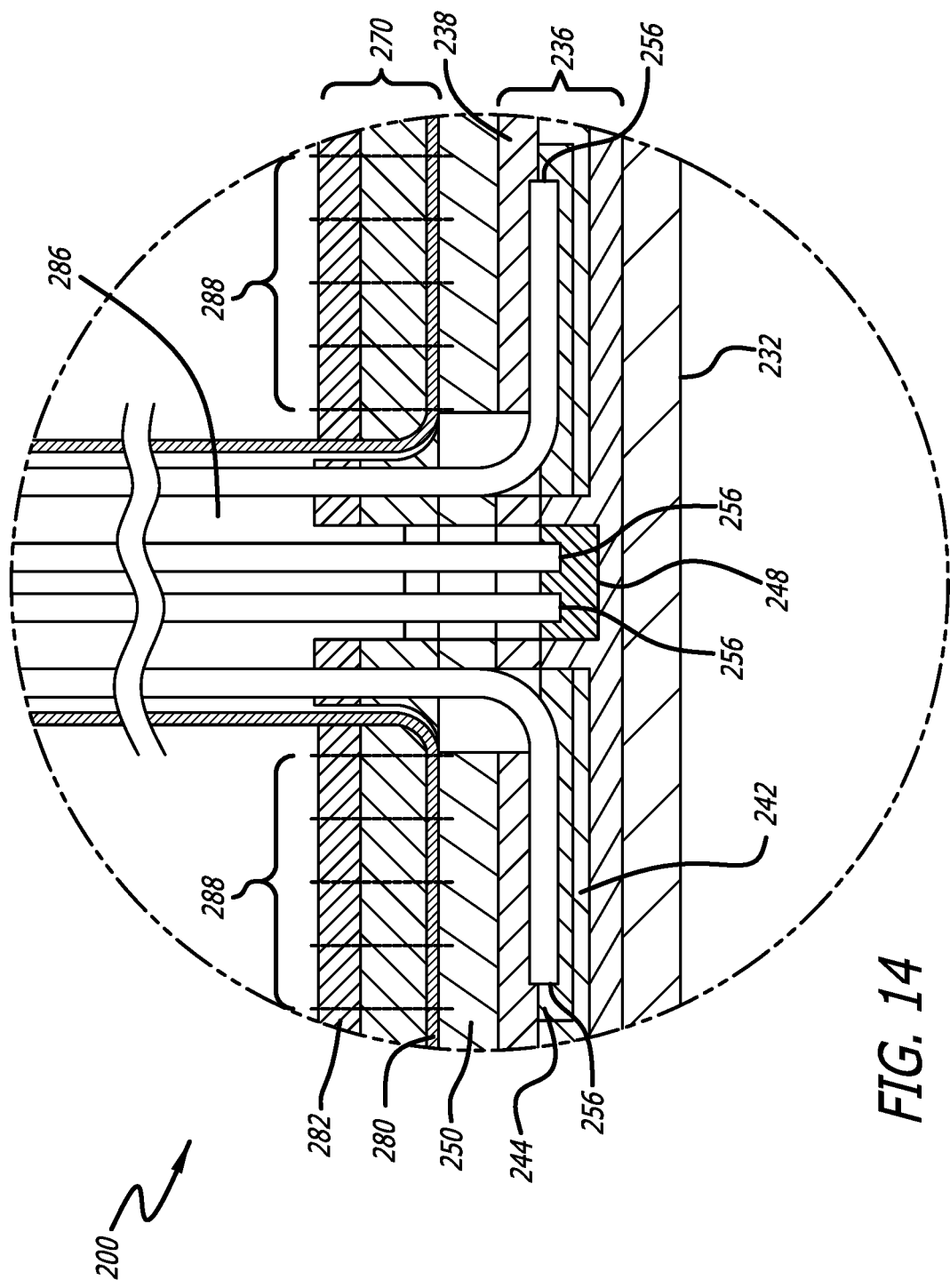
FIG. 14 shows a detailed view of the cross-section of the low profile heater assembly shown in FIG. 13.

FIGS. 13 and 14 show various cross-sectional views of the embodiment of the heater assembly 200 shown in FIG. 12. As shown, the heater body 202 includes the upper assembly 270 and the lower assembly 230 stacked and stitched, sewn, or otherwise coupled together with the perimeter stitches or coupling features 212 in order to form the heater body. The proximal ends 256 of the leads 254 are electrically connected to the pads 244 and the temperature sensor 248, as required. The pads 244 are in electrical contact with the heating element 242 formed in or on the dielectric sheet 238. The distal ends 258 of the leads 254 extend through the passage 286 of the lead sleeve 278.

Figure 15A:
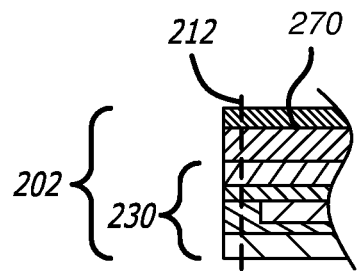
FIGS. 15A and 15B show various views of the embodiment of the low profile heater assembly shown in FIGS. 12 and 13.
Figure 15B:
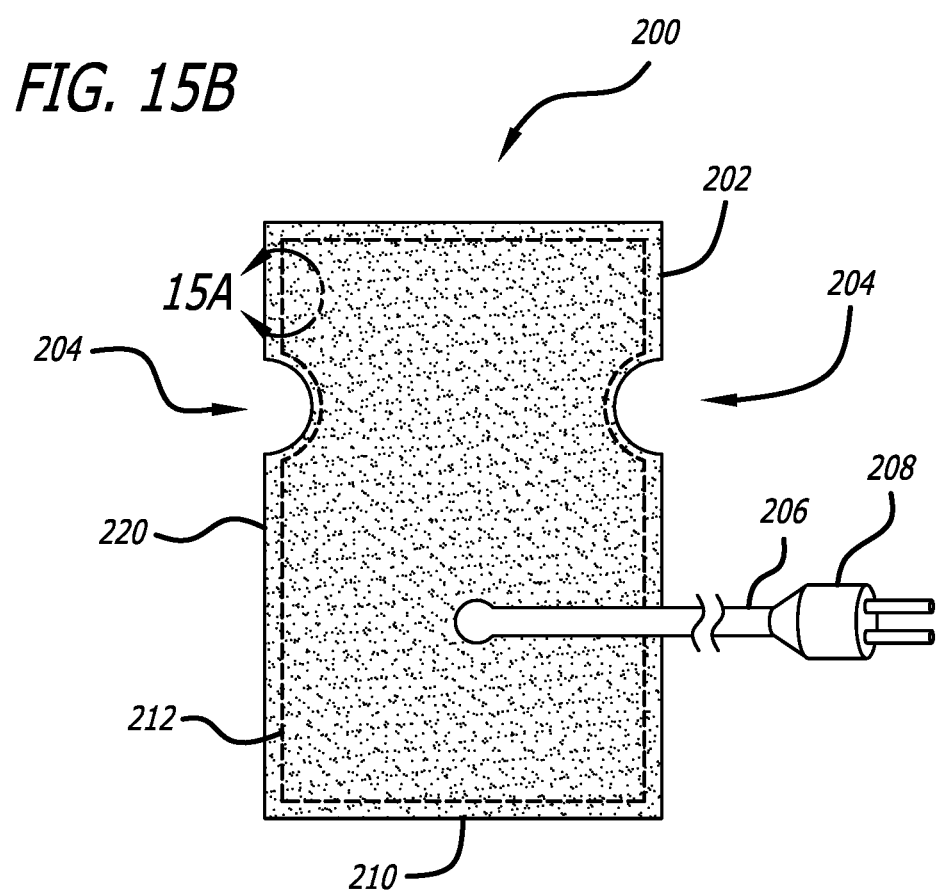

FIGS. 15A and 15B show a cross-sectional view and a plan view of an alternate embodiment of a heater assembly 200, respectively. One or more reliefs 204 configured to provide clearance for the fittings 126, 136, 146 shown in FIGS. 1 and 2 may be formed in the perimeter 210 of the heater body 202. As shown, the perimeter stitching or coupling feature 212 as described above with respect to FIG. 12 extends around the perimeter 210 and reliefs 204 of the heater body 202 thereby securely attaching the upper assembly 270 to the lower assembly 230.

Figure 16A:
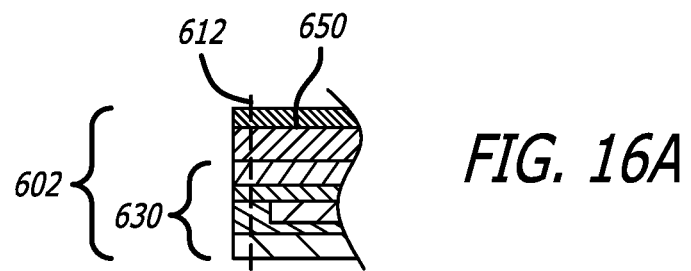
FIGS. 16A and 16B show various views of an alternate embodiment of a low profile heater assembly.
Figure 16B:
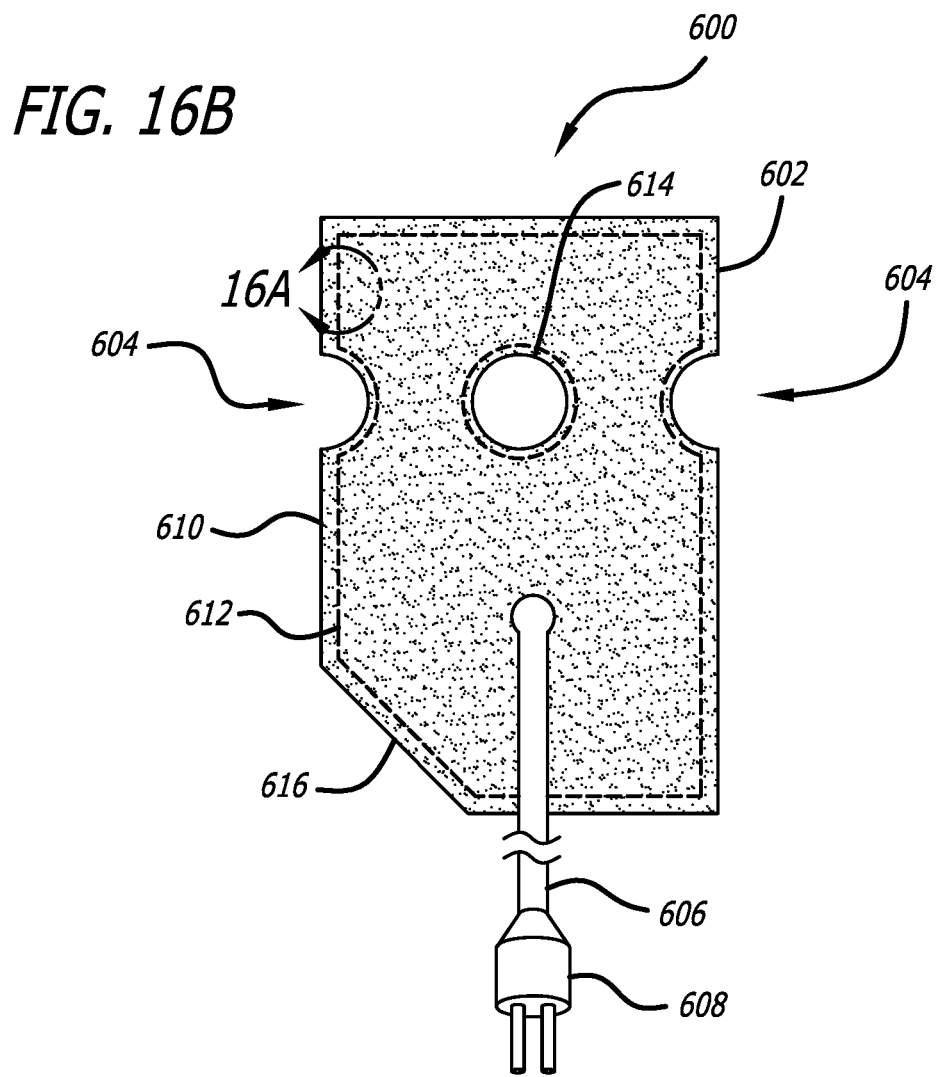

FIGS. 16A and 16B show a cross-sectional view and a plan view of an embodiment of a heater assembly 600, respectively. As shown in FIG. 16A, the heater assembly 600 includes at least one lower assembly 630 and at least one upper assembly 650. As shown in FIG. 16B, one or more reliefs 604 analogous to the reliefs 204 shown in the embodiment of the heater assembly 200 in FIG. 15B may be formed in the heater body 602. In addition to the reliefs 604, one or more apertures 614 and one or more chamfers 616 may be formed in the heater body 602 to provide clearance for various components or fittings 126, 136, 146 attached to the tubing 120, 130, 140 or for the manifold 108 shown in FIGS. 1 and 2. As shown, one or more perimeter stitches or coupling features 612 extend around the perimeter 610 of the heater body 602, around the reliefs 604, around the aperture 614, and along the chamfer 616. The perimeter stitches or coupling features 612 may be formed from the same or similar materials or combination of materials as described above with respect to the stitches or coupling features 212, 284 and 288. Similar to the heater assembly 200 described above, the heater assembly 600 may include one or more cables 606 and one or more connectors 608 configured to provide electrical communication with one or more heater controllers or other components or systems as described above with respect to the heater assembly 200.

FIG. 17 shows an elevated perspective view of an embodiment of the heater assembly 200 shown in FIG. 15B installed on a tube 120 of the inlet head 104 shown in FIG. 2. As shown, at least one retention member 300 may be used to retain the heater assembly 200 in contact with the tube 120. In the illustrated embodiment, the retention member 300 is a spring clip formed from precipitation-hardened corrosion resistant (stainless) steel. Optionally, the retention member 300 may be formed from austenitic stainless steels, martensitic stainless steels, spring steels or high-temperature polymers such as PEEK polyether ether ketone, Ultem® polyetherimide (PEI) or Torlon® polyamide-imide (PAI), although those skilled in the art will appreciate that the retention member 300 may be formed from any variety of materials. In the alternative, hose clamps, cable ties, or hook & loop fasteners and straps may be used to secure the heater assembly 200 to the tube 120. In short, any variety of coupling devices may be used to couple the heater assembly 200 to the tube 120.

Figure 18:
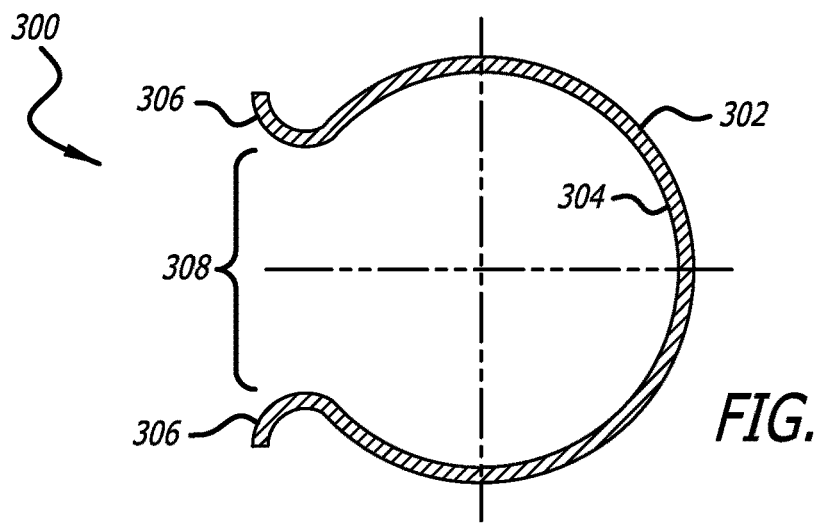
FIG. 18 shows a view of an embodiment of the retention member shown in FIG. 17.

FIG. 18 shows a cross-sectional view of an embodiment of the retention member 300 shown in FIG. 17. As shown, the retention member 300 includes at least one retention member body 302 with at least one inner surface 304. The shape of the inner surface 304 could be a radius, a variable radius or elliptical shape, although those skilled in the art will appreciate that the inner surface 304 may have any variety of shapes. One or more tangs 306 may be formed on the retention member body 302, the tangs 306 defining an opening 308 configured to allow the retention member 300 to slide over the heater assembly 200 without damaging it. During use, the heater assembly 200 may be wrapped around the tube 120 and one or more retention members 300 may be slid over the heater assembly 200, thereby securely holding the heater assembly 200 in thermal contact with the tube 120. Optionally, the retention member 300 may be formed integral to the heater body 202.

Figure 19A:
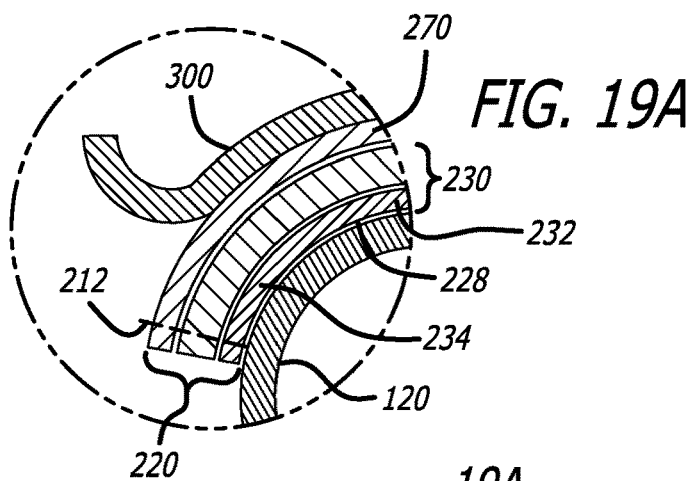
FIGS. 19A and 19B show various cross-sectional views of the embodiment of the heater assembly installed on the tube of the inlet head shown in FIG. 17.
Figure 19B:
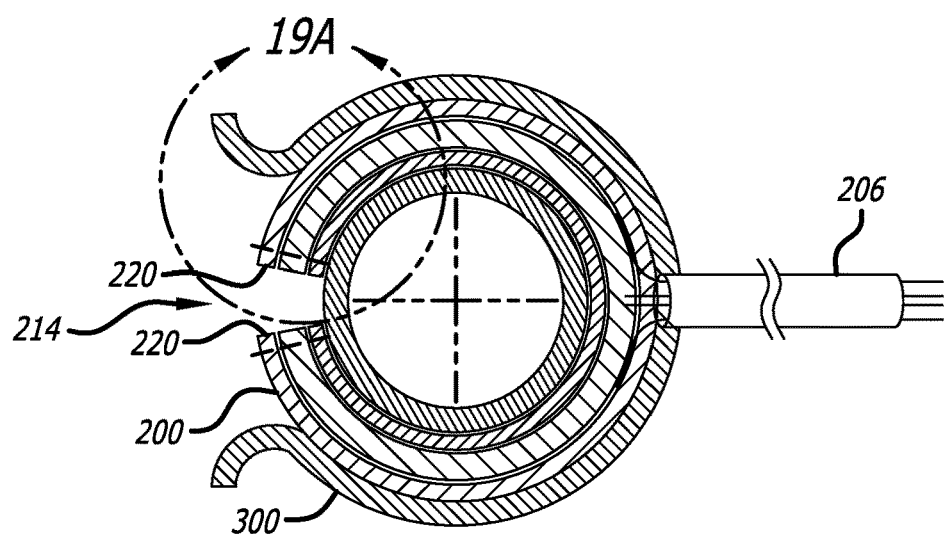

FIGS. 19A and 19B show various cross-sectional views of an embodiment of the heater assembly 200 installed on a tube 120 shown in FIG. 17. As shown, the heater assembly 200 comprises at least one lower assembly 230 and at least one upper assembly 270 and at least one cable 206. In the illustrated embodiment, when the heater assembly 200 is wrapped around or otherwise positioned on the tube 120, the edges 220 may not meet on the far side of the tube 120. As such, one or more opposing edges 220 may define one or more gaps 214. As shown, at least one surface 234 of the first sheet 232 of the lower assembly 230 may be retained in thermal communication with the tube 120 by one or more retention members 300. A thermal conducting paste 228 configured to improve heat transfer may be applied between the surface 234 of the first sheet 232 of the heater assembly 200 and the outer diameter of the tube 120. Optionally, thermal conducting paste 228 need not be used.

Figure 20A:
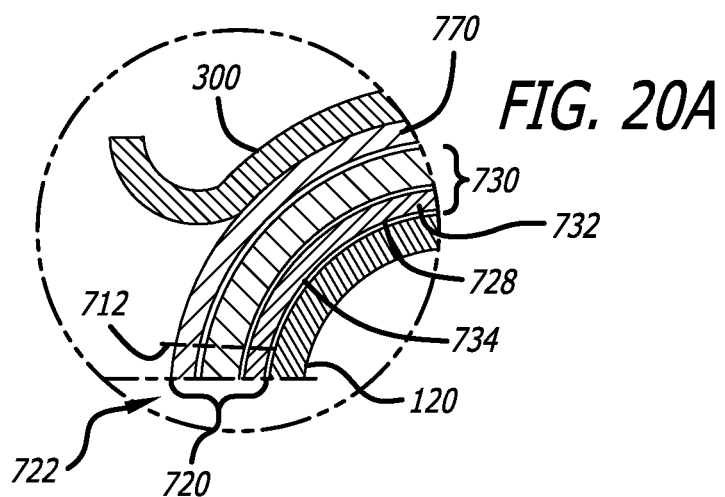
FIGS. 20A and 20B show various cross-sectional views of an alternate embodiment of the heater assembly installed on the tube of the inlet head shown in FIG. 17.
Figure 20B:
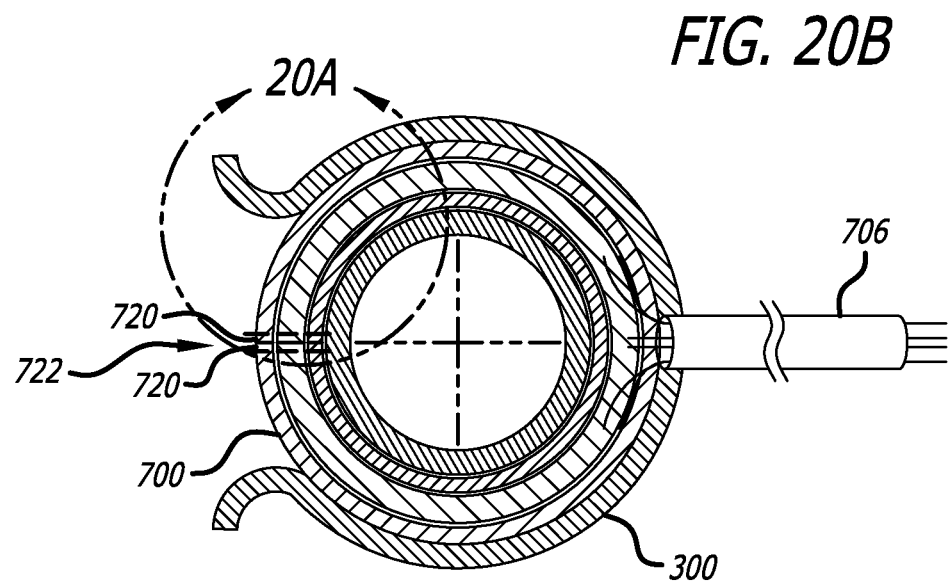

FIGS. 20A and 20B show various cross-sectional views of an embodiment of a heater assembly 700. As shown, the heater assembly 700 comprises at least one lower assembly 730 and at least one upper assembly 770 and at least one cable 706. One or more connectors 708 (not shown) may be installed onto the cable 706. In the illustrated embodiment, the lower assembly 730 and the upper assembly 770 are fastened together around its perimeter with one or more perimeter stitches or coupling features 712. The perimeter stitches or coupling features 712 may be formed from the same or similar materials or combination of materials as described above with respect to the stitches or coupling features 212, 284, 288 and/or 612. In the illustrated embodiment, when the heater assembly 700 is wrapped around or otherwise positioned on the tube 120, the edges 720 substantially meet on the far side of the tube 720. As such, any gap 722 between the edges 720 may be minimized or eliminated, potentially leading to superior heating performance of the heater assembly 700 relative to the heater assembly 200 described above. As shown, the inner surface 734 of the first sheet 732 of the lower assembly 730 is retained in thermal communication with the tube 120 by one or more retention members 300. A thermal conducting paste 728 configured to improve heat transfer between the heater assembly 700 and the tube 120 may be applied between the surface 734 of the first sheet 732 of the heater assembly 700 and the outer diameter of the tube 120. Optionally, thermal conducting paste 728 need not be used. In another embodiment, the edges 720 of the heater assembly 700 may overlap or interfere with each other.

Figure 21:
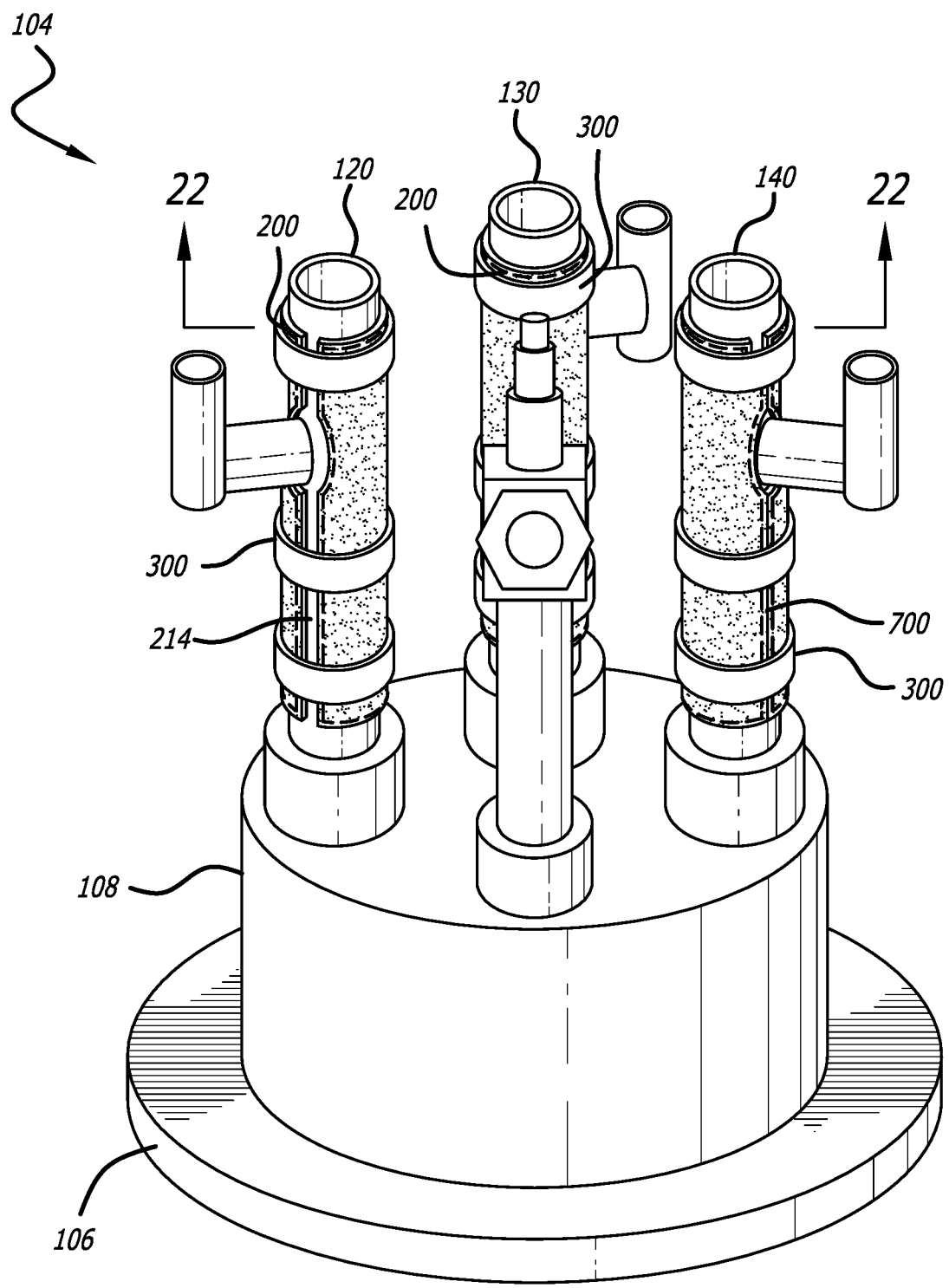
FIG. 21 shows an elevated perspective view of an embodiment of the low profile heater assemblies shown in FIGS. 15B and 20B as installed on the inlet head shown in FIG. 2.
Figure 22:
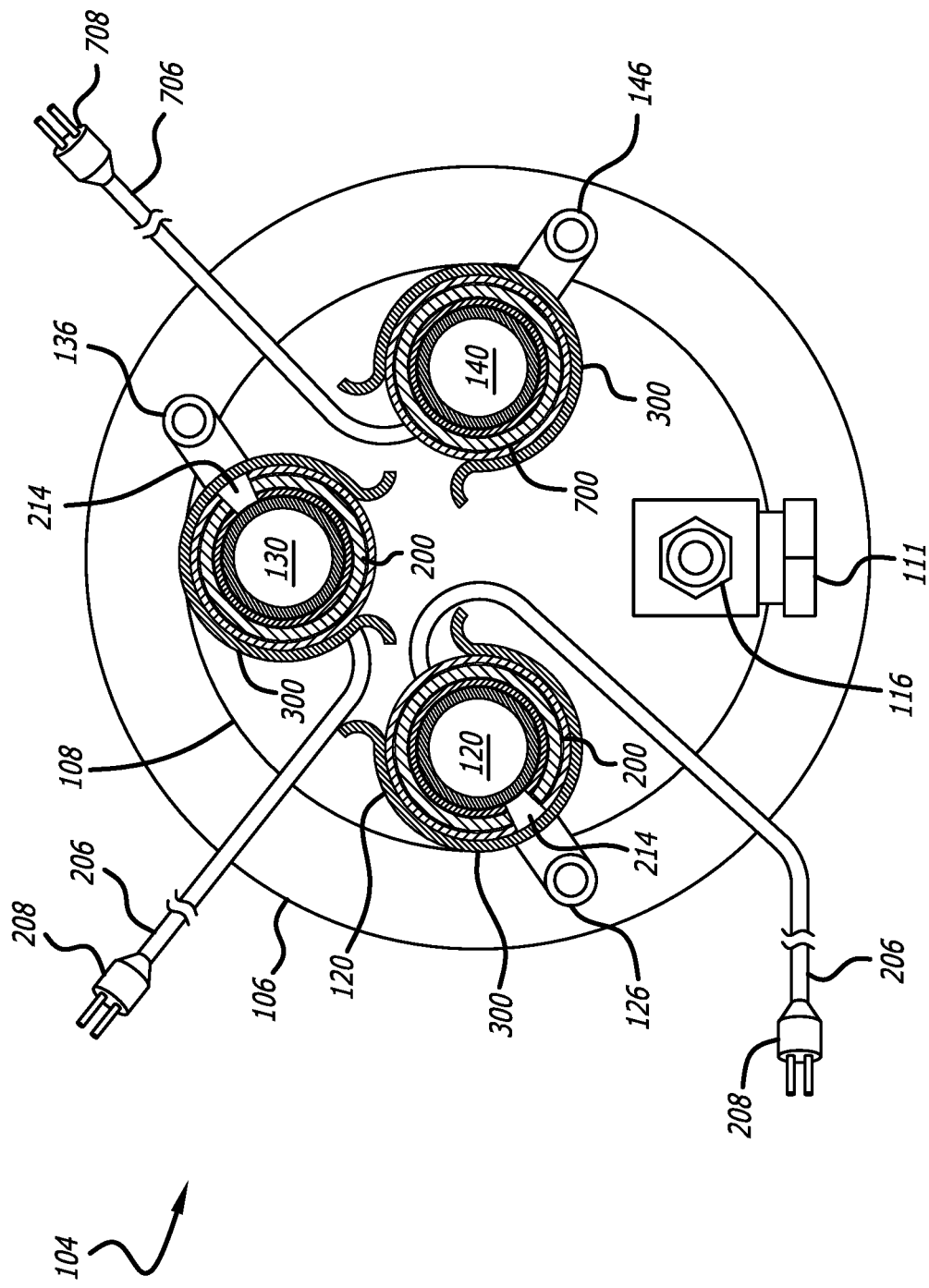
FIG. 22 shows a cross-sectional view of an embodiment of the low profile heater assemblies as installed on the inlet head shown in FIG. 21.

FIGS. 21 and 22 show various views of the inlet head 104 with heaters installed on tubes 120, 130 and 140. As shown in FIG. 21, heater assemblies 200 are installed on each tube 120 and 130, and a heater assembly 700 is installed on tube 140. As shown, each of the three heater assemblies are securely retained in contact with their respective tubes by three retention members 300, although those skilled in the art will appreciate that any number of retention members 300 may be used. As shown, the gap 214 is visible on the heater assembly 200 installed on tube 120. The heater assembly 700 installed on tube 140 does not exhibit a gap for the reasons described above with respect to FIGS. 20A and 20B. For the heater assembly 200 installed on tube 130, the gap 214 is not visible in FIG. 21, but it can be seen in the section view on FIG. 22. Referring to FIG. 22, the design of the retention member 300 enables its installation over the heaters at a variety of angular orientations with respect to the heater assemblies (hereinafter "heaters") 200, 700, the tubes 120, 130, 140, and the fittings 126, 136, 146, thereby enabling flexibility in installation and removal of the heaters 200 and 700 on the inlet head 104.

Figure 23:
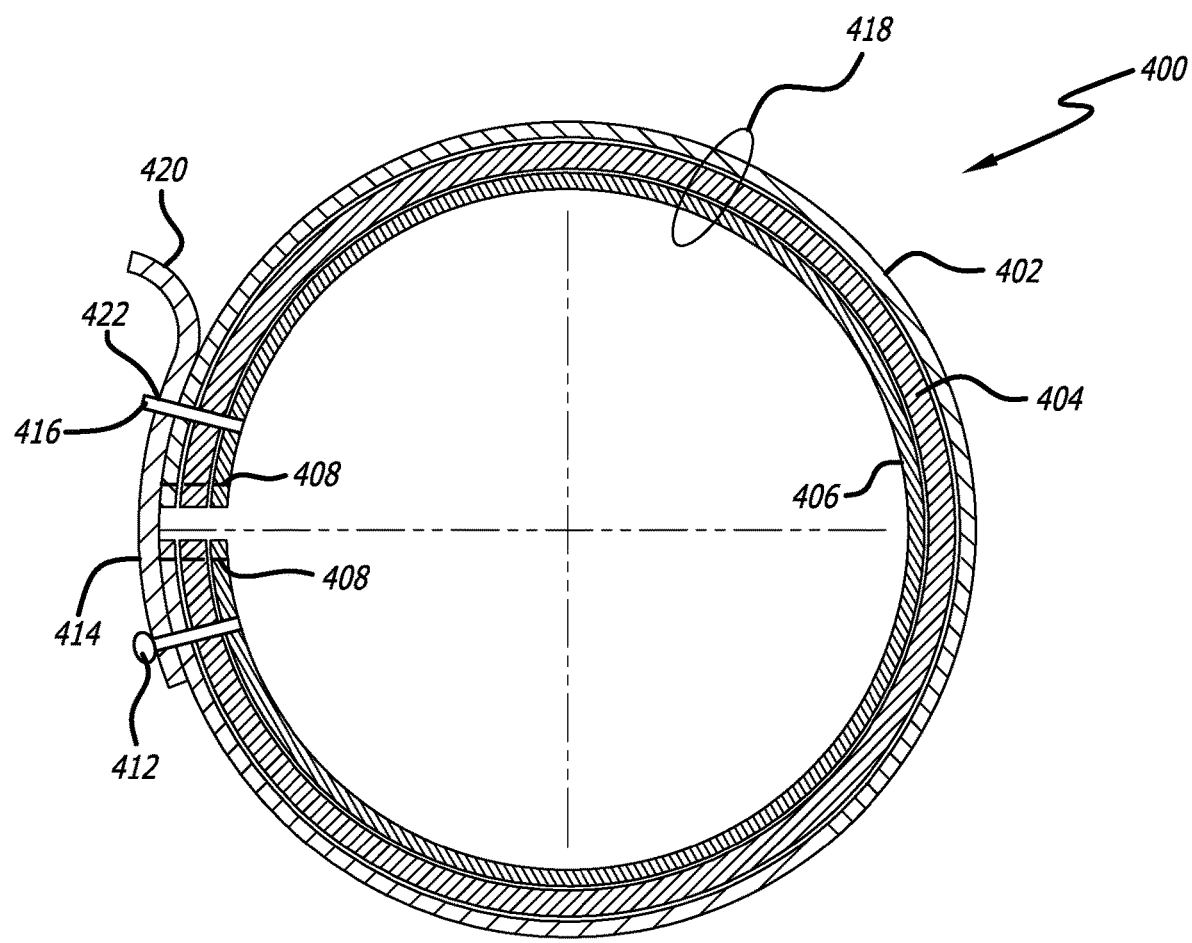
FIG. 23 shows a cross-sectional view of an embodiment of an outer insulation jacket assembly.
Figure 24:
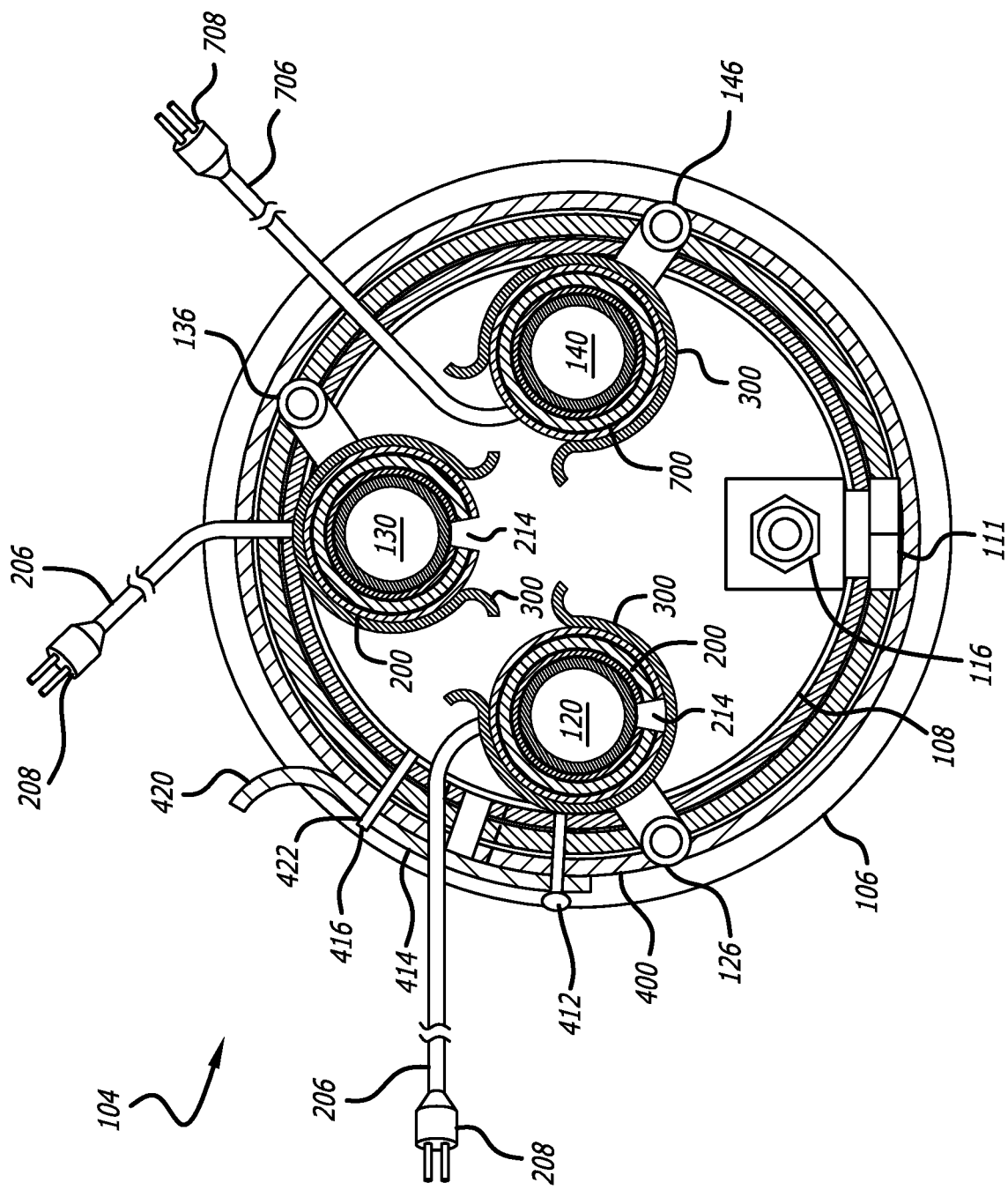
FIG. 24 shows a cross-sectional view of an embodiment of an outer insulation jacket assembly installed on the inlet head shown in FIGS. 21 and 22.

FIGS. 23 and 24 show various views of an outer insulator jacket 400 configured to be detachably installed around and/or over the inlet head 104. FIG. 23 shows a cross-sectional view of an embodiment of the outer insulator jacket 400. The outer insulator jacket 400 includes at least one jacket body 418. In the illustrated embodiment, the jacket body 418 comprises at least one outer layer 402, at least one middle layer 404 and at least one inner layer 406. Exemplary materials for the layers 402, 404, 406 include, without limitation, polyimide fabric, Kevlar fabric, and the like. Those skilled in the art will appreciate that any variety of heat-resistant materials may be used in the layers 402, 404, 406. Those skilled in the art will appreciate that only a single layer or two layers may be used. The inner layer 404 may comprise at least one insulating material. Exemplary insulating materials include, without limitation, fiberglass, asbestos, Kevlar and the like. Those skilled in the art will appreciate that any variety of insulating materials may be used to form the insulating layer 404. Optionally, any of the three layers 402, 404, 406 may be made from an insulating material. The layers 402, 404, 406 may be joined together by one or more stitches or coupling features 408. The perimeter stitches or coupling features 712 may be formed from the same or similar materials or combination of materials as described above with respect to the stitches or coupling features 212, 284, 288, 612 and/or 712. At least one retention member 414 may be secured to at least one first fastener 412. In the illustrated embodiment, the retention member 414 is a rubber or fabric strap with at least one attachment region 422 formed thereon or integral thereto. Those skilled in the art will appreciate that the retention member 414 may be made from any variety or combination of materials. Exemplary attachment region configurations include, without limitation, holes, slots, grommets, and the like. Those skilled in the art will appreciate that the attachment region 422 could be any variety of configurations. At least one second fastener 416 configured to secure the outer insulator jacket 400 around the inlet head 104 may be retained in the jacket body 418. Exemplary fasteners 416 include snaps, buckles, D-rings, and the like. One or more tabs 420 configured to be grasped by an operator during installation of the outer insulator jacket 400 may be formed on or integral to the retention member 414. Those skilled in the art will appreciate that the retention member 414 may be made of a hook and loop fastening device such as Velcro® formed on or attached to the jacket body 418.

FIG. 24 shows a section view of the embodiment of the outer insulator jacket 400 installed on the inlet head 104. During installation of the outer insulator jacket 400, the user may actuate the tab 420 to urge the attachment region 422 onto or over the fastener 416, enabling the user to detachably install the outer insulator jacket 400 onto the inlet head 104. During operating of the gas abatement system 100, the outer insulator jacket 400 may be installed to reduce the transfer of thermal energy from the inlet head 104 and heaters 200, 700 to the ambient environment, thereby enabling the user to closely and precisely control the heaters 200, 700 to maintain the inlet head 104 at a desired temperature or range of temperatures.

Figure 25:
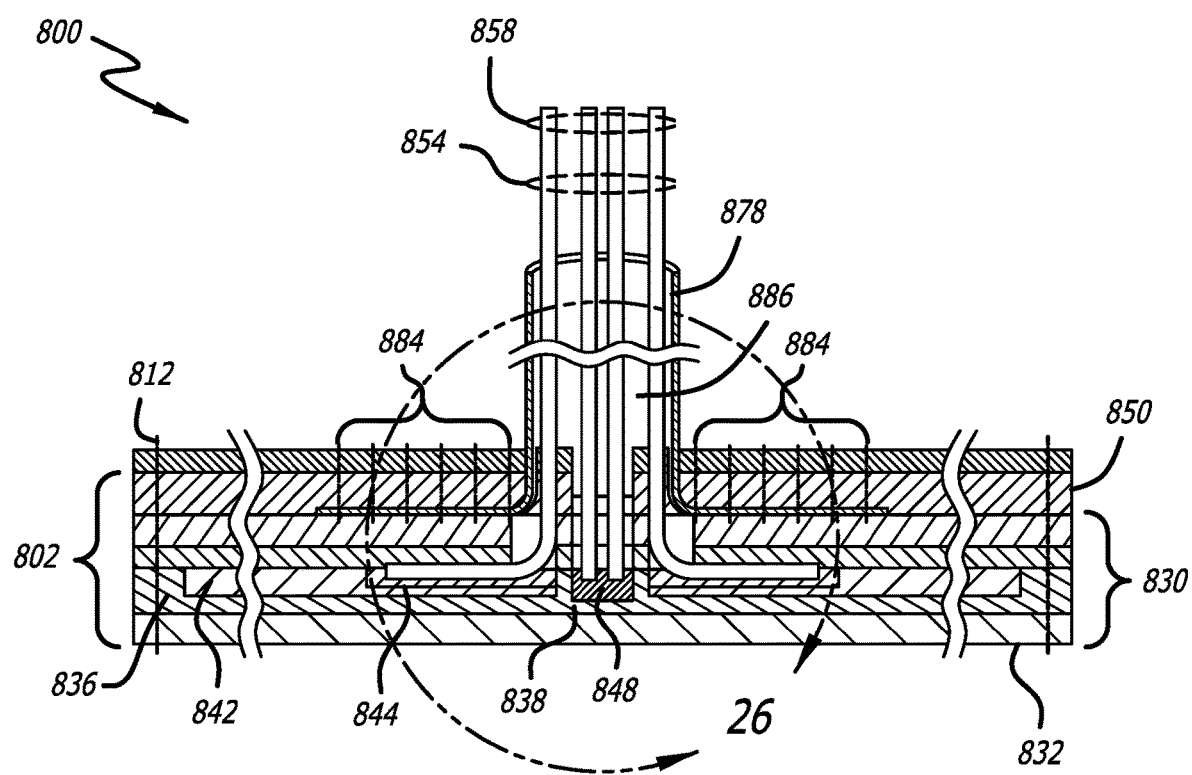
FIG. 25 shows a cross-sectional view of an embodiment of an outer heater jacket assembly.
Figure 26:
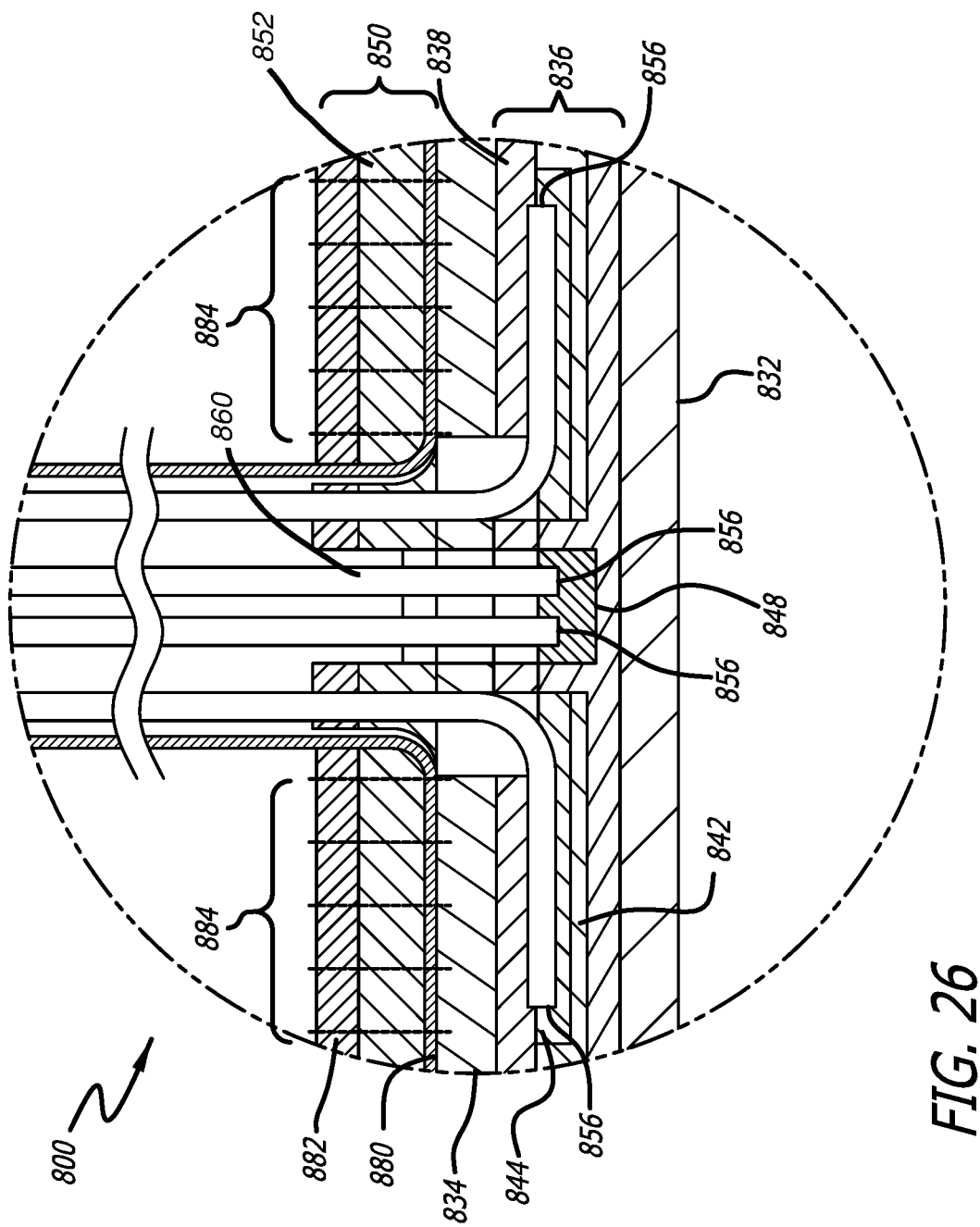
FIG. 26 shows detailed cross-sectional view of the embodiment of an outer heater jacket assembly shown in FIG. 25.

FIGS. 25-27B show various views of an outer heater jacket assembly 800 (also referred to as heater assembly 800). FIGS. 25 and 26 show various cross-sectional views of an embodiment of the outer heater jacket assembly 800. As shown, the outer heater jacket assembly 800 includes at least one lower assembly 830, at least one upper assembly 850 and at least one cable 804. The lower assembly 830 may include at least one first sheet 832, at least one heating sheet 836, at least one dielectric sheet 838, and at least one intermediate sheet 834. Exemplary materials for the first sheet 832 include polyimide fabric, Kevlar fabric, and the like as described above with respect to heater assemblies 200, 600 and 700. Optionally, those skilled in the art will appreciate that any variety of heat-resistant materials may be used in the first sheet 832 or the various components forming the jacket assembly 800. The heating sheet 836 may include at least one heating element 842 formed on or attached to at least one dielectric sheet 838. One or more pads 844 configured to provide electrical contact to the heating element 842 may be formed on or integral to the heating element 842. Optionally, the pads 844 need not be formed on the heating element 842, and the proximal ends 856 of the electrical leads 854 may be attached in electrical communication directly to the heating element 842. The heating element 842 may comprise an etched foil resistive material deposited on the dielectric sheet 838. Exemplary resistive materials have been listed above with respect to heater assembly 200. Optionally, the heating element 842 may comprise resistance wire, intermetallic compounds, PTC ceramic elements, composite heaters, thick films and the like. In the illustrated embodiment, the dielectric sheet 838 is a polyimide film. Optionally, the dielectric sheet 838 may be silicone rubber, Kapton, Kevlar, Teflon or PTC rubber, although those skilled in the art will appreciate that any variety of material may be used in the dielectric sheet 838. At least one insulating material (not shown) and/or at least one adhesive (not shown) may be applied to the dielectric sheet 838 to securely attach the elements of the heating sheet together. Exemplary adhesives have been described above with respect to the heater assembly 200. At least one temperature sensor 848 may be attached to or formed integral to the heating sheet 836 or the heating element 842.

Referring to FIGS. 25 and 26, the upper assembly 850 may include at least one top sheet 852 with at least one lead sleeve 878 extending through at least one aperture 860 formed in the top sheet 852. Optionally, the upper assembly 850 may include one or more cover sheets 882 fastened to the top sheet 852 to provide additional protection for the heater assembly 800, for cosmetic purposes, or to provide additional protection of the electrical leads 854. As shown in FIG. 25, the lead sleeve 878 may be split into one or more split sleeves 880 configured to be securely attached to the top sheet 852 by one or more stitches or coupling features 884. The distal ends 858 of the electrical leads 854 from the lower assembly 830 may traverse through the passage 886 of the lead sleeve 878. The upper assembly 850 is secured to the lower assembly 830 with one or more perimeter stitches or coupling features 812. In the illustrated embodiment, the perimeter stitches or coupling features 812 comprises a high-temperature thread. The stitches or coupling features 812 and 884 may be formed from the same or similar materials or combination of materials as described above with respect to the stitches or coupling features 212, 284, and 288.

Figure 27A:
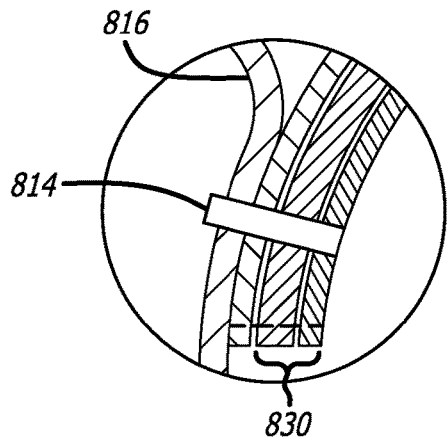
FIGS. 27A and 27B show various cross-sectional views of an embodiment of an outer heater jacket assembly.
Figure 27B:
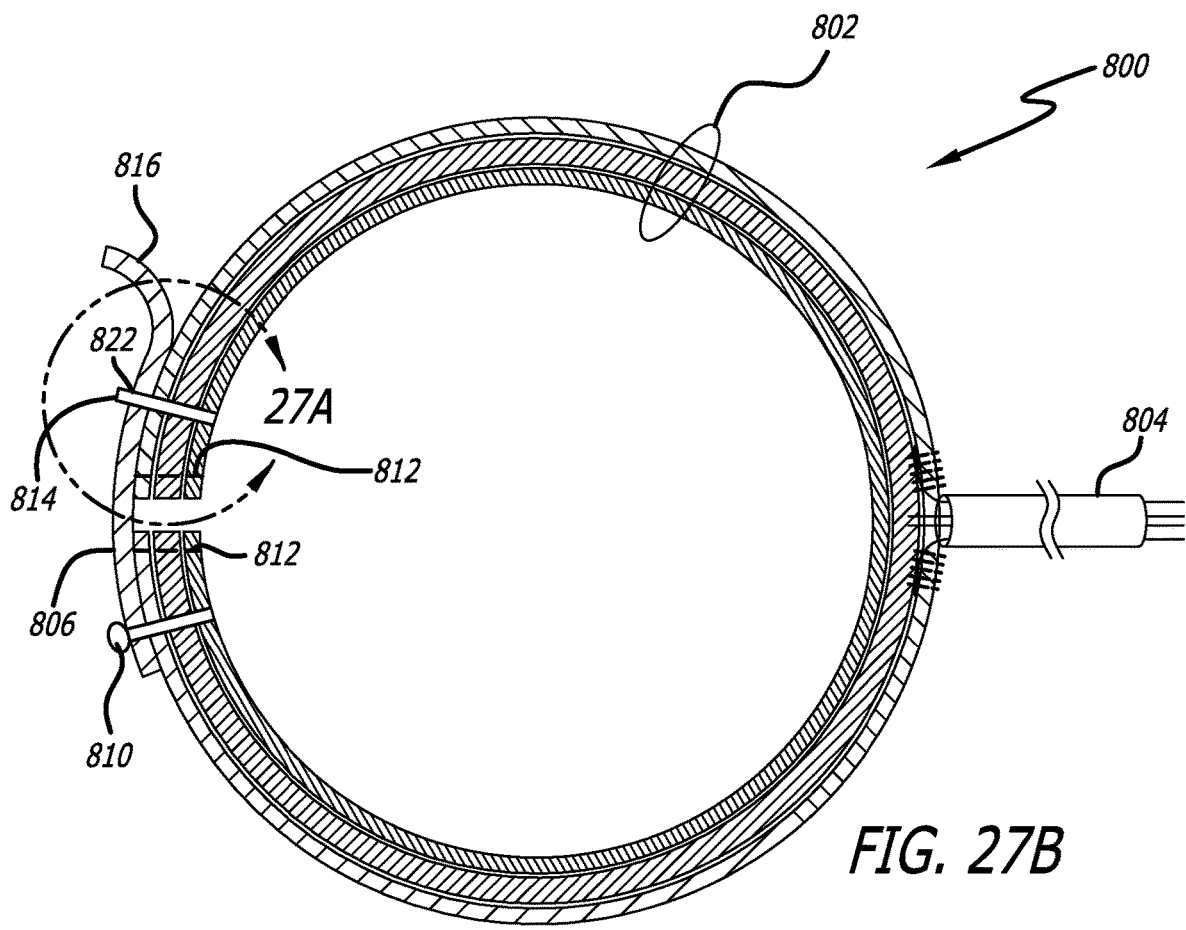

Referring to FIGS. 27A and 27B, at least one retention member 806 may be secured to at least one first fastener 810 located in the heater body 802. In the illustrated embodiment, the retention member 806 is a rubber or cloth strap with at least one attachment region 822 formed thereon or integral thereto. Those skilled in the art will appreciate that the retention member 806 may be made from any variety of materials. Exemplary attachment region 822 configurations include, without limitation, holes, slots, grommets, and the like. Those skilled in the art will appreciate that the attachment region could be any variety of configurations. At least one second fastener 814 configured to secure the outer heater jacket assembly 800 around the inlet head 104 may be retained in the heater body 802. Exemplary second fasteners 814 include snaps, buckles, D-rings, and the like. At least one tab 816 may be formed on or integral to the retention member 806. Those skilled in the art will appreciate that the retention member 806 may be made of a hook and loop fastening device such as Velcro® formed on or attached to the heater body 802.

Figure 28:
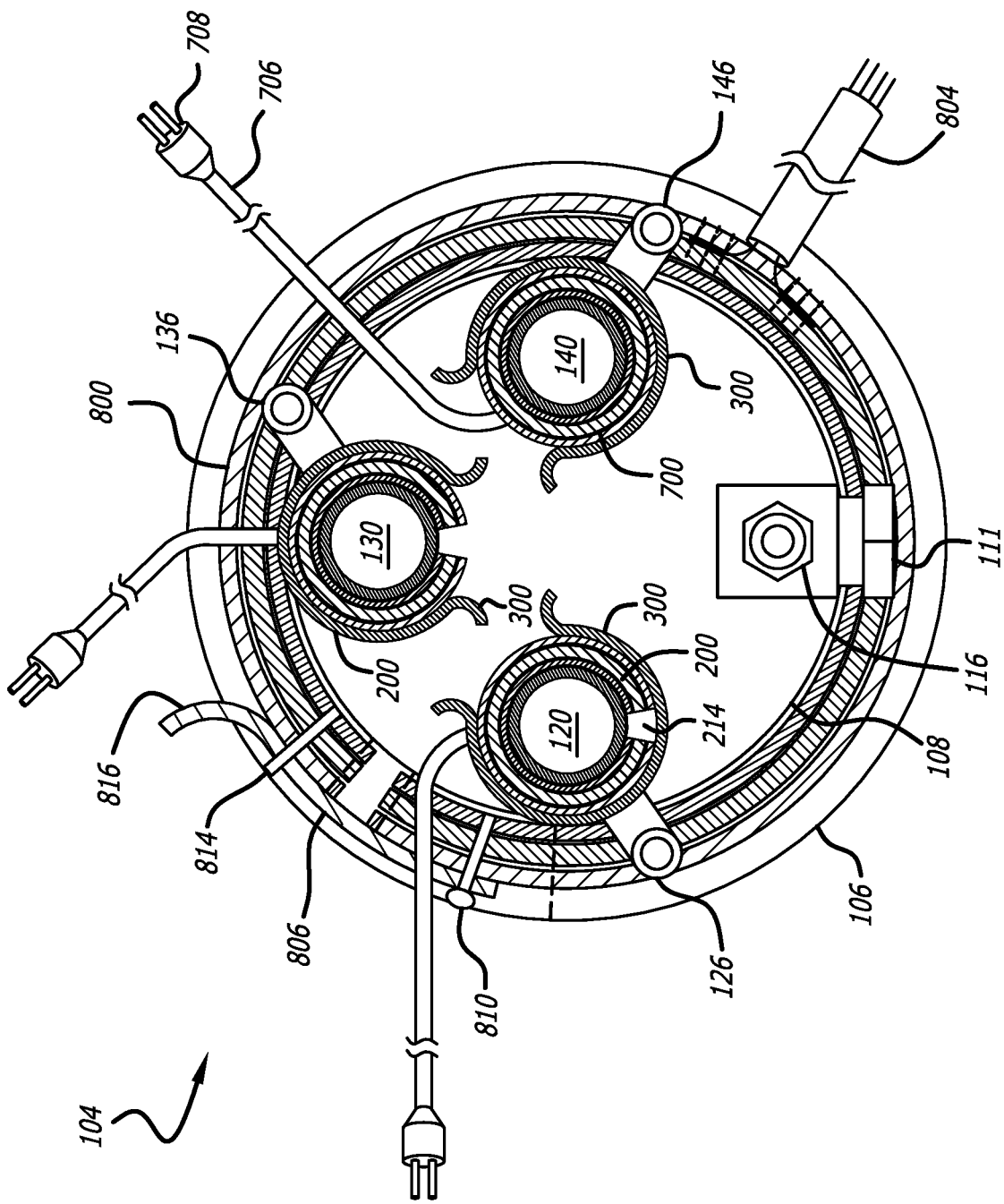
FIG. 28 shows a cross-sectional view of an embodiment of an inlet head assembly with the heater assemblies shown in FIGS. 15B, 20B and 27B installed on the inlet head assembly shown in FIG. 21.

FIG. 28 shows a section view of the embodiment of the outer heater jacket assembly 800 installed on the inlet head 104. During installation, the user may actuate the tab 816 to urge the attachment region 822 onto or over the second fastener 814, enabling the user to detachably install the outer heater jacket assembly 800 onto the inlet head 104. During operating of the gas abatement system 100, the outer heater jacket assembly 800 may be installed to reduce the transfer of thermal energy from the inlet head 168 and heaters 200, 700 to the ambient environment, thereby enabling the users to more closely and precisely control the heaters 200, 700 to maintain the inlet head 104 at a desired temperature or range of temperatures.

The present application describes various embodiments of a low profile heater apparatus and attachment method. While particular embodiments have been illustrated and described herein, it will be apparent that modifications to the design may be made without departing from the spirit and scope of the embodiments of the invention. As such, it is appreciated by persons skilled in the art that the present invention is not limited by what has been particularly shown and described above herein. Rather, the scope of the present invention includes both combinations and sub-combinations of various features described hereinabove as well as variations and modifications thereto which would occur to a person of skill in the art upon reading the above description and which are not in the prior art.

What is claimed is:

1. A low-profile heater apparatus, comprising:
   at least one lower assembly, including at least one first sheet, at least one heating sheet including at least one heating element formed on one or more dielectric sheets, at least one intermediate sheet, and one or more electrical leads in electrical communication with the at least one heating element and configured to supply electrical power to the at least one heating element;

at least one upper assembly, including at least one top sheet with one or more passages formed therein, the one or more passages configured to allow at least one lead sleeve to traverse therethrough, the at least one lead sleeve and at least one lead sleeve passage extending therethrough, the at least one lead sleeve passage configured to accept the one or more electrical leads from the at least one lower assembly to pass therethrough;

at least one heater body, the at least one heater body including the at least one lower assembly and the at least one upper assembly coupled together with one or more perimeter coupling features; and at least one strain relief structure, the at least one strain relief structure including one or more split sleeves extending from the at least one lead sleeve, wherein the one or more split sleeves are fastened to the at least one top sheet by one or more split sleeve coupling features configured to securely attach the one or more split sleeves to the at least one top sheet, wherein the at least one strain relief structure is configured to prevent damage to the one or more electrical leads.

2. The low-profile heater apparatus of claim 1, wherein the at least one heating sheet includes one or more pads formed thereon and in electrical communication with the at least one heating element, the one or more pads configured to allow one or more proximal ends of the one or more electrical leads to be attached thereto.

3. The heater apparatus of claim 1, further comprising at least one temperature sensor formed on or attached to the at least one heating sheet and in thermal communication with the at least one heating element.

4. The heater apparatus of claim 1, further comprising one or more heater apparatus retention members slid over the heater apparatus, thereby engaging and securely retaining the heater apparatus in thermal contact with one or more tubes of at least one plumbing apparatus.

5. The heater apparatus of claim 1, further including one or more reliefs formed in the at least one heater body.

6. The heater apparatus of claim 5, further including one or more apertures formed in the at least one heater body, the one or more apertures configured to allow clearance for one or more fittings of one or more tubes of at least one plumbing apparatus.

7. The heater apparatus of claim 6, further including one or more chamfers formed in the heater body, the one or more chamfers configured to allow clearance for at least one fitting or feature of the one or more tubes of at least one plumbing apparatus.

8. The heater apparatus of claim 1, further comprising one or more heater apparatus retention members slid over the heater apparatus, thereby engaging and securely retaining the heater apparatus in thermal contact with one or more tubes of at least one plumbing apparatus.

9. The heater apparatus of claim 1, wherein at least one of the one or more split sleeve coupling features and the one or more perimeter coupling features comprises one or more adhesives disposed between the at least one lower assembly and the at least one upper assembly.

10. The heater apparatus of claim 1, wherein at least one of the one or more split sleeve coupling features and the one or more perimeter coupling features comprises stitches of high-temperature thread.

11. A heater apparatus, comprising:
at least one lower assembly including:
at least one first sheet made from at least one heat-resistant fabric;
at least one heating sheet including at least one dielectric sheet, at least one heating element formed on the at least one dielectric sheet, and one or more pads formed on the at least one heating element, the one or more pads configured to allow one or more electrical leads to be attached in electrical communication with the at least one heating element;
at least one intermediate sheet, including one or more passages formed on or therethrough and configured to permit the one or more electrical leads to traverse through the one or more passages and be securely attached in electrical communication with the one or more pads formed on the at least one heating element;
at least one upper assembly including:
at least one top sheet with at least one passage formed therein, the at least one passage configured to allow at least one lead sleeve to traverse therethrough, the at least one lead sleeve further including one or more split sleeves and at least one lead sleeve passage extending therethrough, the at least one lead sleeve passage configured to accept the one or more electrical leads from the at least one lower assembly to pass therethrough; and
wherein the one or more split sleeves are fastened to the at least one top sheet by one or more split sleeve coupling features in the at least one top sheet; and
one or more perimeter coupling features applied around at least one perimeter of the at least one lower assembly and at least one perimeter of the at least one upper assembly, wherein the one or more perimeter coupling features are configured to securely attach the at least one upper assembly to the at least one lower assembly, to form at least one heater body.

12. The heater apparatus of claim 11, wherein at least one temperature sensor is formed onto or attached to the heating sheet.

13. The heater apparatus of claim 11, further comprising at least one electrical connector configured to be electrically connected to the one or more electrical leads.

14. The upper assembly of claim 11, further comprising at least one cover sheet stitched to the at least one top sheet and the one or more split sleeves.

15. The heater apparatus of claim 11, further including one or more reliefs formed in the at least one heater body.

16. The heater apparatus of claim 15, further including one or more apertures formed in the at least one heater body, the one or more apertures configured to allow clearance for one or more fittings of one or more tubes of at least one plumbing apparatus.

17. The heater apparatus of claim 16, further including one or more chamfers formed in the at least one heater body, the one or more chamfers configured to allow clearance for at least one fitting or feature of one or more tubes of the at least one plumbing apparatus.

18. The heater apparatus of claim 11, further comprising one or more heater apparatus retention members slid over the heater apparatus, thereby engaging and securely retaining the heater apparatus the heater apparatus in thermal contact with one or more tubes of at least one plumbing apparatus.

19. The heater apparatus of claim 18, wherein the one or more heater apparatus retention members are formed integral to the at least one heater body.

20. The heater apparatus of claim 11, wherein at least one of the one or more split sleeve coupling features and the one or more perimeter coupling features comprises one or more adhesives disposed between the at least one lower assembly and the at least one upper assembly.

21. The heater apparatus of claim 11, wherein at least one of the one or more split sleeve coupling features and the one or more heater body coupling features comprises stitches of high-temperature thread.

22. A method of manufacture of a low profile heater apparatus, comprising:
   providing at least one lower assembly, the at least one lower assembly comprising at least one first sheet, at least one heating sheet including at least one dielectric sheet with at least one heating element formed thereon, at least one intermediate sheet, and one or more electrical leads in communication with the at least one heating element;
   providing at least one least one upper assembly, the at least one upper assembly comprising at least one top sheet with one or more passages formed therein, the one or more passages configured to allow at least one lead sleeve to traverse therethrough, the at least one lead sleeve further including one or more split sleeves and at least one lead sleeve passage extending therethrough, the at least one lead sleeve passage configured to accept the one or more electrical leads from the at least one lower assembly to pass therethrough;
   forming one or more split sleeve strain relief structures in the at least one upper assembly by coupling the one or more split sleeves to the at least one top sheet with one or more split sleeve coupling features; and
   joining the at least one lower assembly to the at least one upper assembly with one or more perimeter coupling features applied around at least one perimeter of the at least one lower assembly and at least one perimeter of the at least one upper assembly, wherein the one or more perimeter coupling features are configured to securely attach the at least one upper assembly to the at least one lower assembly, to form at least one heater body.

23. The heater apparatus of claim 22, wherein the one or more perimeter coupling features comprise one or more adhesives disposed between the at least one lower assembly and the at least one upper assembly.

24. The heater apparatus of claim 22, wherein the one or more perimeter coupling features comprise stitches of high-temperature resistant thread.

* * * * *